(12) United States Patent
Nowak et al.

(10) Patent No.: US 11,034,846 B2
(45) Date of Patent: *Jun. 15, 2021

(54) POLYMER-LIQUID COMPOSITES FOR IMPROVED ANTI-FOULING PERFORMANCE

(71) Applicant: HRL Laboratories, LLC, Malibu, CA (US)

(72) Inventors: Andrew P. Nowak, Los Angeles, CA (US); April R. Rodriguez, Los Angeles, CA (US); Jason A. Graetz, Calabasas, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/960,149

(22) Filed: Apr. 23, 2018

(65) Prior Publication Data

US 2018/0237643 A1    Aug. 23, 2018

Related U.S. Application Data

(63) Continuation-in-part of application No. 15/727,669, filed on Oct. 9, 2017, which is a continuation-in-part
(Continued)

(51) Int. Cl.
*C09D 175/08* (2006.01)
*C09D 5/16* (2006.01)
(Continued)

(52) U.S. Cl.
CPC ........... *C09D 5/1675* (2013.01); *C08G 18/10* (2013.01); *C08G 18/246* (2013.01);
(Continued)

(58) Field of Classification Search
CPC ........ C09D 175/08; C09D 5/00; C09D 5/165; C09D 5/1656; C08G 18/3812; C08G 18/5015; C08G 18/4804; C08G 18/6505
See application file for complete search history.

(56) References Cited

U.S. PATENT DOCUMENTS 3,435,003 A    3/1969    Craven
3,810,874 A    5/1974    Mitsch et al.
(Continued)

FOREIGN PATENT DOCUMENTS

| EP | 1558661 B1 | 12/2012 |
| WO | 1997035919 A1 | 10/1997 |
| WO | 2013158360 A1 | 10/2013 |

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).
(Continued)

*Primary Examiner* — Michael L Leonard
(74) *Attorney, Agent, or Firm* — O'Connor & Company

(57) ABSTRACT

This disclosure describes incorporation of a liquid additive within one or more phases of a multiphase polymer coating. The structure of the microphase-separated network provides reservoirs for liquid in discrete and/or continuous phases. Some variations provide an anti-fouling segmented copolymer composition comprising: (a) one or more first soft segments selected from fluoropolymers; (b) one or more second soft segments selected from polyesters or polyethers; (c) one or more isocyanate species; (d) one or more polyol or polyamine chain extenders or crosslinkers; and (e) a liquid additive disposed in the first soft segments and/or the second soft segments. The first soft segments and the second soft segments are microphase-separated on a microphase-
(Continued)

separation length scale from 0.1 microns to 500 microns. These solid/liquid hybrid materials improve physical properties associated with the coating in applications such as anti-fouling (e.g., anti-ice or anti-bug) surfaces, ion conduction, and corrosion resistance.

**28 Claims, 11 Drawing Sheets
(6 of 11 Drawing Sheet(s) Filed in Color)**

Related U.S. Application Data of application No. 14/829,640, filed on Aug. 19, 2015, now Pat. No. 10,125,227, which is a continuation-in-part of application No. 14/658,188, filed on Mar. 14, 2015, now Pat. No. 10,344,244.

(60) Provisional application No. 62/526,496, filed on Jun. 29, 2017, provisional application No. 62/408,280, filed on Oct. 14, 2016, provisional application No. 62/038,878, filed on Aug. 19, 2014, provisional application No. 61/953,093, filed on Mar. 14, 2014.

(51) Int. Cl.

| | |
|---|---|
| *C09D 127/12* | (2006.01) |
| *C08G 81/00* | (2006.01) |
| *C08G 65/22* | (2006.01) |
| *C09D 171/08* | (2006.01) |
| *C08G 65/00* | (2006.01) |
| *C09D 5/00* | (2006.01) |
| *C08G 18/10* | (2006.01) |
| *C08G 18/24* | (2006.01) |
| *C08G 18/48* | (2006.01) |
| *C08G 18/75* | (2006.01) |
| *C08G 18/50* | (2006.01) |
| *C08G 18/38* | (2006.01) |
| *C08G 18/65* | (2006.01) |
| *C08K 5/00* | (2006.01) |

(52) U.S. Cl.
CPC ..... *C08G 18/3812* (2013.01); *C08G 18/4804* (2013.01); *C08G 18/4833* (2013.01); *C08G 18/5015* (2013.01); *C08G 18/6505* (2013.01); *C08G 18/758* (2013.01); *C08G 65/007* (2013.01); *C08G 65/226* (2013.01); *C08G 81/00* (2013.01); *C09D 5/00* (2013.01); *C09D 5/165* (2013.01); *C09D 5/1656* (2013.01); *C09D 127/12* (2013.01); *C09D 171/08* (2013.01); *C09D 175/08* (2013.01); *C08K 5/0016* (2013.01); *C08K 5/0066* (2013.01)

(56) References Cited

U.S. PATENT DOCUMENTS

| | | | |
|---|---|---|---|
| 3,847,978 A | 11/1974 | Sianesi et al. | |
| 4,777,224 A | 10/1988 | Gorzynski et al. | |
| 4,956,438 A | 9/1990 | Ruetman et al. | |
| 5,032,666 A | 7/1991 | Hu et al. | |
| 5,084,315 A | 1/1992 | Karimi et al. | |
| 5,189,135 A | 2/1993 | Cozzi et al. | |
| 5,290,418 A | 3/1994 | Menchen et al. | |
| 5,332,798 A | 7/1994 | Ferreri et al. | |
| 5,589,552 A | 12/1996 | Simeone et al. | |
| 5,798,415 A | 8/1998 | Corpart et al. | |
| 6,071,564 A | 6/2000 | Marchetti et al. | |
| 6,579,835 B2 | 6/2003 | Scicchitano et al. | |
| 6,926,937 B2 | 8/2005 | Extrand et al. | |
| 6,992,132 B2 | 1/2006 | Trombetta et al. | |
| 7,655,310 B2 | 2/2010 | Trombetta | |
| 9,136,562 B2 | 9/2015 | Singh et al. | |
| 2002/0016267 A1 | 2/2002 | Scicchitano et al. | |
| 2003/0229176 A1 | 12/2003 | Trombetta et al. | |
| 2004/0019143 A1 | 1/2004 | Koloski et al. | |
| 2005/0164010 A1 | 7/2005 | Trombetta | |
| 2006/0189750 A1 | 8/2006 | Maier et al. | |
| 2007/0298216 A1 | 12/2007 | Jing et al. | |
| 2008/0219944 A1 | 9/2008 | Longo et al. | |
| 2010/0324205 A1 | 12/2010 | Maier et al. | |
| 2011/0177987 A1 | 7/2011 | Lenting et al. | |
| 2011/0218290 A1 | 9/2011 | Webster et al. | |
| 2011/0229750 A1 | 9/2011 | McLellan et al. | |
| 2011/0213085 A1 | 11/2011 | Tonelli et al. | |
| 2012/0136120 A1 | 2/2012 | Bosman | |
| 2012/0164565 A1 | 6/2012 | Qiu | |
| 2014/0113144 A1 | 4/2014 | Loth et al. | |
| 2014/0127516 A1 | 5/2014 | Wang et al. | |
| 2014/0162022 A1 | 6/2014 | Nowak et al. | |
| 2015/0158969 A1 | 6/2015 | Nowak | |
| 2015/0329453 A1 | 11/2015 | Guarda et al. | |
| 2016/0028114 A1 | 1/2016 | Pratt et al. | |
| 2016/0194574 A1 | 7/2016 | Nowak et al. | |
| 2016/0201005 A1 | 7/2016 | Nowak et al. | |
| 2017/0174911 A1 | 6/2017 | Nowak et al. | |

OTHER PUBLICATIONS

Siochi et al., "Engineered Surfaces for Mitigation of Insect Residue Adhesion" NF1676L-15481 SAMPE 2013; May 6-9. 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Turri et al., "Waterborne Anionomeric Polyurethane-Ureas from Functionalized Fluoropolyethers," Journal of Applied Polymer Science, vol. 93, 136-144 (2004).
Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "Using the dynamic bond to access macroscopically responsive structurally dynamic polymers," Nature Materials vol. 10, Jan. 2011.
International Search Report and Written Opinion, PCT/US2018/028992, dated Aug. 9, 2018.

310  320

POLYMER-LIQUID COMPOSITES FOR IMPROVED ANTI-FOULING PERFORMANCE

PRIORITY DATA

This patent application claims priority to U.S. Provisional Patent App. No. 62/526,496, filed on Jun. 29, 2017, which is hereby incorporated by reference herein. This patent application is also a continuation-in-part of U.S. patent application Ser. No. 15/727,669, filed on Oct. 9, 2017, which in turn is a continuation-in-part of U.S. patent application Ser. No. 14/829,640, filed on Aug. 19, 2015, each of which is hereby incorporated by reference herein.

FIELD OF THE INVENTION

The present invention generally relates to structured coatings, compositions suitable for such coatings, and methods of making and using the same.

BACKGROUND OF THE INVENTION

Coatings and materials can become soiled from debris (particles, insects, oils, etc.) impacting the surface. The debris affects airflow over the surface as well as aesthetics and normally is removed by washing. Insect impact residue affects vehicle fuel economy, aesthetics, and operator vision. On aircraft, insect residue interferes with airflow over a surface, increasing drag and thus fuel consumption. On automobiles, the light dispersion of headlights, operator vision through the windshield, and aesthetic appeal are degraded from insect remains.

Many solutions to reduce insect debris, such as mechanical scrapers, sacrificial continually released liquid layers, and passive coatings with engineered topology have been flight-tested. However, the best-performing liquid layer release systems add a large size and weight penalty, while the durability of nanostructured surfaces on aircraft or automobile surfaces is unproven. Attempts to mitigate insect accumulation during the early days of aircraft development included mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

One approach to this problem is to create a passive, self-cleaning surface that removes debris from itself by controlling chemical interactions between the debris and the surface. Passive coatings that reduce insect debris are desirable because they have less parasitic mass and do not require the wiring and energy of active systems. No commercial coating provides sufficient residue reduction.

Polymeric materials having low surface energies are widely used for non-stick coatings. These materials are tailored with careful control of their chemical composition (thus surface energy) and mechanical properties. Polymers containing low-energy perfluoropolyethers and perfluoroalkyl groups have been explored for low adhesion and solvent repellency applications. While these low-energy polymers facilitate release of materials adhering to them in both air and water, they do not necessarily provide a lubricated surface to promote clearance of foreign substances. See Vaidya and Chaudhury, "Synthesis and Surface Properties of Environmentally Responsive Segmented Polyurethanes" *Journal of Colloid and Interface Science*, 249, 235-245 (2002). A fluorinated polyurethane is described in U.S. Pat. No. 5,332,798 issued Jul. 26, 1994 to Ferreri et al.

Coatings and materials can also become contaminated from ice forming on the surface. The debris and ice both affect airflow over the surface, for example. Passive, durable anti-icing coatings have been identified as a need in the aerospace field for many decades. However, previous solutions lacked a required level of performance in ice adhesion reduction, adequate long-term durability, or both of these. Some of the most-effective coatings for reducing ice adhesion are dependent on sacrificial oils or greases that have limited useful lifetimes and require regular reapplication. Currently, durable coatings for exposed areas on fixed wing and rotorcraft (such as the leading edge of the wing or rotorblade) include thermoplastic elastomers bonded to the vehicle surface using a film adhesive or an activated adhesive backing incorporated into the coating itself. However, prior compositions do not provide any benefit in lowering ice adhesion.

There remains a desire for coatings on aircraft exteriors (and other aerospace-relevant surfaces) in order to passively suppress the growth of ice, in addition to removing debris, near strategic points on the vehicle—such as the rotorblade edge, wing leading edge, or engine inlet. There also exists a need for high-performance coating materials fabricated in a way that preserves coating function during actual use.

Block copolymers include segmented copolymers containing hard and soft segments. The terminology "hard segments" and "soft segments" derives from the morphology of elastomeric polymers containing phase-separated regions (the hard and soft segments). Generally, soft segments have glass-transition temperatures below 25° C., while hard segments have higher glass-transition temperatures. Soft segments tend to be amorphous, while hard segments are glassy at room temperature and may be crystalline.

Segmented polyurethanes are one such example of physically associated block copolymers in which the backbone includes statistical segments (i.e., regions of polymer backbone) of flexible, weakly associating soft-segment chains typically between 1,000-5,000 g/mol molecular weight and often composed of polyesters or polyethers mixed with rigid highly associated segments containing a high density of urethane bonds. Such structures normally phase-separate at the molecular level (see Petrovic et al., "POLYURETHANE ELASTOMERS" *Prog. Polym. Sci.*, Vol. 16, 695-836, 1991, which is hereby incorporated by reference herein). The soft segments provide the ability to extend under stress, while the associated hard segments limit flow and creep of the material under stress and provide elastic recovery.

A liquid additive may be introduced to a crosslinked polymer in order to swell the network. Swelling in crosslinked polymers can be found in common household items such as the polyelectrolytes used in diapers, along with more sophisticated applications including hydrogels in biomedical fields for the growth of cell tissue or drug delivery. Typically, these materials are covalently crosslinked networks composed of a single polymer phase that expands to incorporate liquid with the expansion arrested by the covalent bonding in the network. Multiphase polymeric materials (in particular, block copolymers) have a similar ability to swell in the presence of a liquid. One phase usually swells preferentially, depending on the character of the separate phases and the liquid. With multi-component block copolymers, the nature of the crosslinking that will arrest the swelling can be either covalent, as in the case of vulcanized materials, or physical, as found in many hydrogen-bonded structures.

Anti-fouling coatings are useful in both bugphobic and icephobic applications. Potential applications include aerospace-relevant surfaces, wind turbine blades, automobiles, trucks, trains, ocean-going vessels, electrical power transmission lines, buildings, windows, antennas, filters, instruments, sensors, cameras, satellites, weapon systems, and chemical plant infrastructure (e.g., heat exchangers).

SUMMARY OF THE INVENTION

Some variations of the invention provide an anti-fouling segmented copolymer composition (or generally, a polymer composition) comprising:

(a) one or more first soft segments selected from fluoropolymers having an average molecular weight from about 500 g/mol to about 20,000 g/mol, wherein the fluoropolymers are $(\alpha,\omega)$-hydroxyl-terminated, $(\alpha,\omega)$-amine-terminated, and/or $(\alpha,\omega)$-thiol-terminated;

(b) one or more second soft segments selected from polyesters or polyethers, wherein the polyesters or polyethers are $(\alpha,\omega)$-hydroxyl-terminated, $(\alpha,\omega)$-amine-terminated, and/or $(\alpha,\omega)$-thiol-terminated;

(c) one or more isocyanate species possessing an isocyanate functionality of 2 or greater, or a reacted form thereof;

(d) one or more polyol or polyamine chain extenders or crosslinkers, or a reacted form thereof; and (e) a liquid additive disposed in the first soft segments and/or the second soft segments.

In some embodiments, the liquid additive is a freezing-point depressant for water. For example, the freezing-point depressant for water may be selected from the group consisting of methanol, ethanol, isopropanol, ethylene glycol, propylene glycol, glycerol, poly(ethylene glycol), and combinations, isomers, or homologous species thereof.

In some embodiments, the liquid additive is a lubricant. For example, the lubricant may be selected from the group consisting of fluorinated oils, fluorocarbon ether polymers of polyhexafluoropropylene, siloxanes, silicone-based oils, polydimethylsiloxane-poly(ethylene glycol) copolymers, polydimethylsiloxane-fluoropolymer copolymers, petroleum-derived oils, mineral oil, plant-derived oils, canola oil, soybean oil, and combinations thereof.

In some embodiments, the liquid additive is an electrolyte for use in battery or other energy-device applications. For example, the electrolyte may be selected from the group consisting of poly(ethylene glycol), dimethyl carbonate, diethyl carbonate, methyl ethyl dicarbonate, ionic liquids, and combinations thereof.

In various embodiments, the liquid additive includes alcohol groups, amine groups, thiol groups, or a combination thereof. In these or other embodiments, the liquid additive includes water.

The liquid additive may be at least partially in gel form. In certain embodiments, the liquid additive further contains a solid lubricant suspended or dissolved in the liquid.

The liquid additive may be selectively disposed in one of the first soft segments or the second soft segments.

In some embodiments of the anti-fouling segmented copolymer composition, the fluoropolymers are present in the triblock structure:

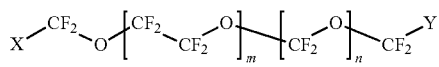

wherein:

X, Y=$CH_2$—(O—$CH_2$—$CH_2$)$_p$-T, and X and Y are independently selected;

p=1 to 50;

T is a hydroxyl, amine, or thiol terminal group;

m=1 to 100; and n=0 to 100, or 1 to 100.

Optionally, the molar ratio of the second soft segments to the first soft segments is less than 2.0.

In various embodiments, the first soft segments and the second soft segments are microphase-separated on a microphase-separation length scale from about 0.1 microns to about 500 microns. The microphase-separation length scale is from about 0.5 microns to about 100 microns, in certain embodiments. There may also be a nanophase-separation length scale that is hierarchically distinct from the microphase-separation length scale. In some embodiments, for example, the first soft segments and the second soft segments further are nanophase-separated on a nanophase-separation length scale from about 10 nanometers to about 100 nanometers.

The liquid additive may be present in the composition at a concentration from about 1 wt % to about 75 wt %.

The anti-fouling composition may be present in a coating, such as an anti-ice coating, an anti-bug coating, and/or an anti-friction coating. In some embodiments, the composition is present on an automotive or aerospace vehicle. In these or other embodiments, the composition is present in an energy-transfer material or an energy-storage material.

Other variations of the invention provide an anti-fouling segmented copolymer precursor composition (or generally, a precursor composition) comprising:

(a) one or more first soft segments selected from fluoropolymers having an average molecular weight from about 500 g/mol to about 20,000 g/mol, wherein the fluoropolymers are $(\alpha,\omega)$-hydroxyl-terminated, $(\alpha,\omega)$-amine-terminated, and/or $(\alpha,\omega)$-thiol-terminated;

(b) one or more second soft segments selected from polyesters or polyethers, wherein the polyesters or polyethers are $(\alpha,\omega)$-hydroxyl-terminated, $(\alpha,\omega)$-amine-terminated, and/or $(\alpha,\omega)$-thiol-terminated;

(c) one or more isocyanate species possessing an isocyanate functionality of 2 or greater, or a reacted form thereof;

(d) one or more polyol or polyamine chain extenders or crosslinkers, or a reacted form thereof; and (e) a liquid additive precursor disposed in the first soft segments and/or the second soft segments, wherein the liquid additive precursor includes a protecting group.

In some embodiments, the liquid additive precursor includes alcohol groups and at least one protecting group that protects the alcohol groups from reacting with the anti-fouling segmented copolymer precursor composition. For example, the protecting group may be selected from the group consisting of trimethylsilyl ether, isopropyldimethylsilyl ether, tert-butyldimethylsilyl ether, tert-butyldiphenylsilyl ether, tribenzylsilyl ether, triisopropylsilyl ether, 2,2,2-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, and combinations thereof.

In some embodiments, the liquid additive precursor includes amine groups and at least one protecting group that protects the amine groups from reacting with the anti-fouling segmented copolymer precursor composition. For example, a protecting group may be selected from the group consisting of vinyl carbamate, 1-chloroethyl carbamate, 4-methoxybenzenesulfonamide, acetamide, benzylamine, benzyloxy carbamate, formamide, methyl carbamate, trifluoroacetamide, tert-butoxy carbamate, and combinations thereof.

In some embodiments, the liquid additive precursor includes thiol groups and at least one protecting group that protects the thiol groups from reacting with the anti-fouling segmented copolymer precursor composition. For example, a protecting group may be selected from S-2,4-dinitrophenyl thioether, S-2-nitro-1-phenylethyl thioether, or a combination thereof.

The liquid additive precursor may include a protecting group that is capable of deprotecting the liquid additive precursor in the presence of atmospheric moisture.

In some embodiments, the liquid additive precursor is capable of condensation curing to increase its molecular weight. For example, the liquid additive precursor may include a silane, a silyl ether, a silanol, an alcohol, or a combination or reaction product thereof.

The liquid additive precursor may be selectively disposed in one of the first soft segments or the second soft segments.

In certain embodiments, the fluoropolymers are present in the triblock structure:

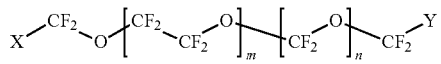

wherein:
X, Y=CH$_2$—(O—CH$_2$—CH$_2$)$_p$-T, and X and Y are independently selected;
p=1 to 50;
T is a hydroxyl, amine, or thiol terminal group;
m=1 to 100; and
n=0 to 100, or 1 to 100.

Optionally, the molar ratio of the second soft segments to the first soft segments is less than 2.0.

The first soft segments and the second soft segments may be microphase-separated on a microphase-separation length scale from about 0.1 microns to about 500 microns.

The liquid additive precursor may be present in the composition at a concentration from about 1 wt % to about 75 wt %.

Other variations of the invention provide a method of making an anti-fouling segmented copolymer, the method comprising:

(a) generating a reaction mixture comprising (i) fluoropolymers, (ii) polyesters or polyethers, (iii) isocyanate species, and (iv) polyol or polyamine chain extenders or crosslinkers;

(b) introducing a liquid additive precursor into the reaction mixture, wherein the liquid additive precursor includes a liquid additive and a protecting group that protects the liquid additive from reacting with the fluoropolymers, the polyesters or polyethers, the isocyanate species, or the polyol or polyamine chain extenders or crosslinkers;

(c) subjecting the reaction mixture to effective reaction conditions to generate a segmented copolymer comprising (i) one or more first soft segments containing the fluoropolymers, (ii) one or more second soft segments containing the polyesters or polyethers, (iii) hard segments containing a reaction product of the isocyanates and the polyol or polyamine chain extenders or crosslinkers;

(d) deprotecting at least some of the liquid additive precursor by removing the protecting group, thereby generating the liquid additive admixed with the segmented copolymer; and (e) recovering an anti-fouling segmented copolymer containing the segmented copolymer and the liquid additive.

Other variations of the invention provide a method of making an anti-fouling segmented copolymer, the method comprising:

(a) generating a reaction mixture comprising (i) fluoropolymers, (ii) polyesters or polyethers, (iii) isocyanate species, and (iv) polyol or polyamine chain extenders or crosslinkers;

(b) introducing a liquid additive precursor into the reaction mixture, wherein the liquid additive precursor is capable of condensation curing to increase its molecular weight;

(c) subjecting the reaction mixture to effective reaction conditions to generate a segmented copolymer comprising (i) one or more first soft segments containing the fluoropolymers, (ii) one or more second soft segments containing the polyesters or polyethers, (iii) hard segments containing a reaction product of the isocyanates and the polyol or polyamine chain extenders or crosslinkers;

(d) during or after step (c), condensation curing the liquid additive precursor to generate a liquid additive admixed with the segmented copolymer, wherein the liquid additive has a higher molecular weight than the liquid additive precursor; and (e) recovering an anti-fouling segmented copolymer containing the segmented copolymer and the liquid additive.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1:
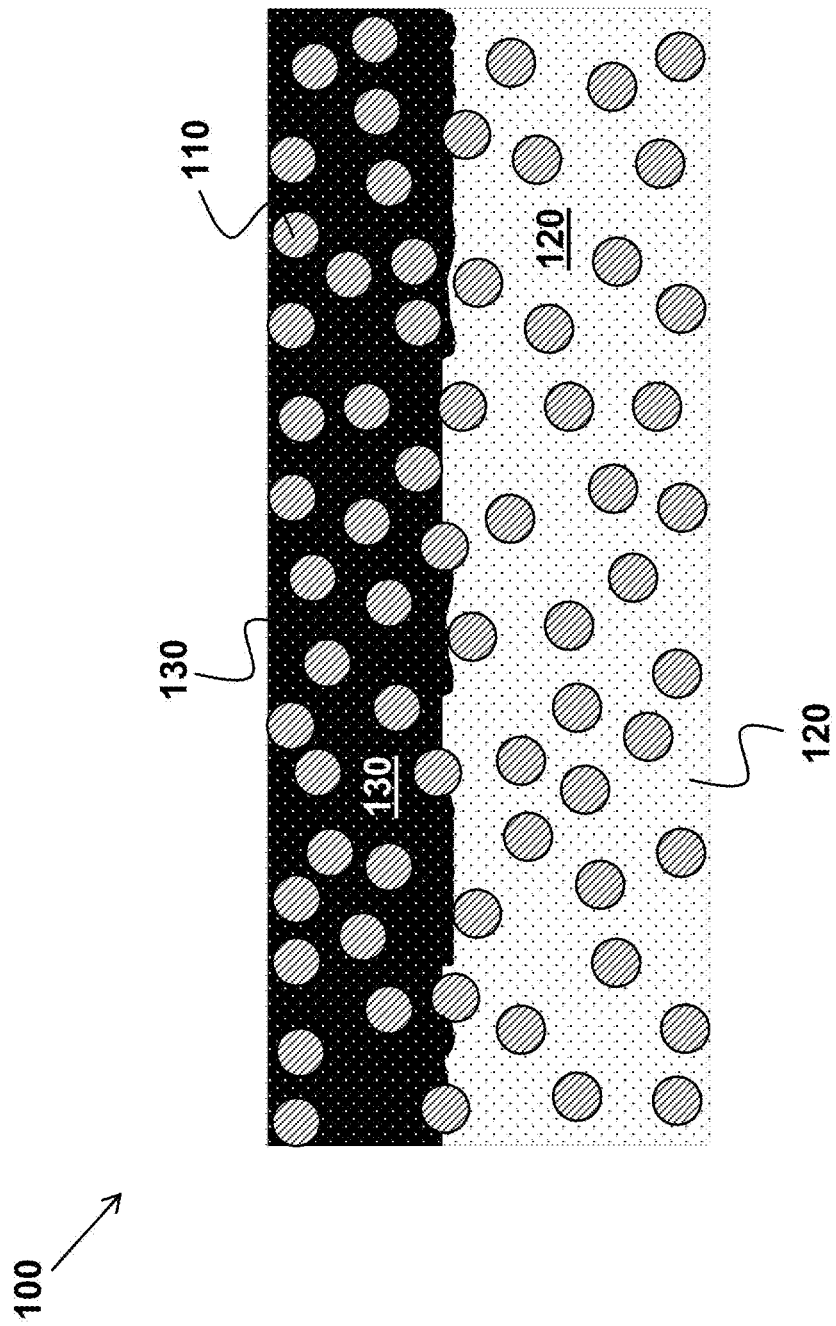
FIG. 1 depicts a composition comprising a first solid material and a second solid material that are microphase-separated, and a liquid selectively disposed in either of the first solid material or the second solid material, in some embodiments.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in a Markush group. Thus in some embodiments not otherwise explicitly recited, any instance of "comprising" may be replaced by "consisting of" or, alternatively, by "consisting essentially of."

HRL Laboratories' technologies described in U.S. patent application Ser. No. 14/658,188 (filed on Mar. 14, 2015), U.S. patent application Ser. No. 14/829,640 (filed on Aug. 19, 2015), U.S. patent application Ser. No. 15/073,615 (filed on Mar. 17, 2016), U.S. patent application Ser. No. 15/608,975 (filed on May 30, 2017), and U.S. patent application Ser. No. 15/727,669 (filed on Oct. 9, 2017) include, among other things, polymeric coating compositions containing fluoropolymer and poly(ethylene glycol) flexible segments that phase-separate to create regions rich in the two respective components on microscopic length scales (such as 0.1-100 μm). These coatings have application potential for bugphobicity due to the fact that they combine non-stick fluoropolymer regions with water-absorbing poly(ethylene glycol) regions that can swell with water and provide lubricity. The combination of non-stick regions and lubrication improves the probability of insects or debris striking the surface and bouncing or sliding off with little to no residue left behind. Certain thermoplastic compositions disclosed in U.S. patent application Ser. No. 14/829,640 have been found to significantly delay the freezing of ice. Certain vulcanized variations disclosed in U.S. patent application Ser. No. 15/073,615 segregate fluoropolymer and water-absorbing elements in discrete block copolymer precursors, for bugphobicity while maintaining good transparency. U.S. patent application Ser. Nos. 14/658,188, 14/829,640, 15/073,615, 15/608,975, and 15/727,669 are each hereby incorporated by reference herein.

This patent application is premised on the preferential incorporation of a liquid additive within one or more phases of a multiphase polymer coating. The structure of the microphase-separated network provides reservoirs for liquid in either the discrete or continuous phases, or potentially for distinct liquids in different phases. These solid/liquid hybrid materials have potential to improve physical properties associated with the coating in applications such as anti-fouling (e.g., anti-ice or anti-bug) surfaces, ion conduction, and corrosion resistance. Coating performance may be enhanced compared to coatings containing only solid materials, across a range of applications.

Unless otherwise indicated, all references to "phases" in this patent application are in reference to solid phases or liquid phases. A "phase" is a region of space (forming a thermodynamic system), throughout which all physical properties of a material are essentially uniform. Examples of physical properties include density and chemical composition. A solid phase is a region of solid material that is chemically uniform and physically distinct from other regions of solid material (or any liquid or vapor materials that may be present). The solid phases are typically polymeric and may melt or at least undergo a glass transition at elevated temperatures. Reference to multiple solid phases in a composition or microstructure means that there are at least two distinct material phases that are solid, without forming a solid solution or homogeneous mixture.

Some variations provide a composition comprising: a first solid material and a second solid material that are chemically distinct, wherein the first solid material and the second solid material are microphase-separated, and wherein the first solid material and the second solid material have different surface energies; and at least one liquid selectively disposed in either of the first solid material or the second solid material. In preferred embodiments, the first and second solid materials are first and second soft segments of a segmented copolymer.

In some embodiments, the first soft segments form a continuous matrix and the second soft segments are a plurality of discrete inclusions. In other embodiments, the first soft segments are a plurality of discrete inclusions and the second soft segments form a continuous matrix. In some embodiments, there are both phase-separated inclusions of the same chemical material, as well as physically and chemically distinct materials as additional inclusions.

As intended herein, "microphase-separated" means that the first and second solid materials (e.g., soft segments) are physically separated on a microphase-separation length scale from about 0.1 microns to about 500 microns.

By "liquid" (or equivalently, "liquid additive") it is meant any material that has a liquid phase at 25° C. and 1 bar pressure. Many liquids are possible for inclusion in the polymer composition. One example is water introduced into a hygroscopic phase in order to lubricate the surface to lower potential for debris (e.g., bugs) to accumulate at a surface. Another example is a fluorinated liquid that is incorporated into a low-surface-energy phase to provide a similar lubricating effect. Traditional anti-freeze liquids (such as glycols including ethylene glycol, propylene glycol, glycerol, or ethylene glycol oligomers) are useful for improving anti-icing properties. The incorporation of carbonate-based liquids or oligomers of polyethers can improve ionic conductivity for use in energy-storage applications, for example.

By a liquid being "disposed in" a solid material, it is meant that the liquid is incorporated into the bulk phase of one of the first or second solid materials, and/or onto the surface of one of the first or second solid materials. The liquid additive will be in close physical proximity with the first or second solid material, intimately and/or adjacently. The disposition is meant to include various mechanisms of chemical or physical incorporation, including but not limited to, chemical or physical absorption, chemical or physical adsorption, chemical bonding, ion exchange, or reactive inclusion (which may convert at least some of the liquid into another component or a different phase). Also a liquid disposed in a solid material may or may not be in thermodynamic equilibrium with the local composition or the environment. Liquids may or may not be permanently contained in the composition; for example, depending on volatility or other factors, some liquid may be lost to the environment over time.

By "selectively" disposed in one of the first or second solid materials, it is meant that of the liquid that is disposed within the composition, at least 51%, preferably at least 75%, and more preferably at least 90% of the liquid is disposed in only one of the solid materials. In various embodiments, the selectivity into one of the solid materials is about, or at least about, 60%, 65%, 70%, 75%, 80%, 85%, 90%, 95%, or 99%. Note that there may be excess liquid that is not disposed in either of the first or second solid materials; this excess liquid can be recovered and is not included in the calculation of selectivity.

In some embodiments, a liquid additive is added to a cured polymer such as by submerging and soaking into the first or second soft segments or otherwise disposing the liquid additive in the first or second soft segments. In these embodiments, the liquid may be absorbed into a solid material. In certain embodiments, the liquid absorption into a given solid material swells that material, which means that there is an increase of volume of that solid material due to absorption of the liquid. Note that the liquid may be, but does not need to be, classified as a solvent for the solid material which it swells. Selectively swelling only one of the solid materials (phases), rather than non-selectively swelling the entire composition, avoids chemically or physically destabilizing the overall polymer network.

In some embodiments, a liquid is not necessarily absorbed into a solid material but rather is entrapped within a film of the solid material, such as a plurality of regions of solid material that surround liquid. In these embodiments, a liquid additive may be introduced to a liquid reaction mixture while mixing, followed by casting the mixture in the liquid state. As the polymer film cures, droplets or regions of liquid additive may be trapped by regions of surrounding cured polymer soft segments, thereby forming a liquid additive disposed in the first or second soft segments. In certain embodiments, a liquid additive is also added to the already cured polymer such as by submerging and soaking into the first or second soft segments, resulting in a liquid additive disposed in the first or second soft segments in multiple ways.

The liquid additive may be at least partially in gel form. A "gel" is a dispersion of molecules of a liquid within a solid medium. A gel is a jelly-like material that can have properties ranging from soft and weak to hard and tough. By weight, gels are mostly liquid, but behave like solids due to a three-dimensional crosslinked network within the liquid.

In addition to the liquid(s), various solid additives may be present. Additives may be selected from the group consisting of a particulate filler, a lubricating agent, a pigment, a dye, a plasticizer, a flame retardant, a flattening agent, and a substrate adhesion promoter.

The phase-separated microstructure preferably includes discrete islands of one material within a continuous sea of the other material. The continuous or percolating phase(s) provides unbroken channels within the material for transport of mass and/or electrical charge. Either the discrete or continuous phase, or both of these, may serve as a reservoir for performance-enhancing liquids such as anti-freeze liquids, lubricants, or ionic electrolytes. In some embodiments, incorporation of a liquid that is selective for the continuous phase is desirable. In other embodiments, incorporation of a liquid that is selective for the discrete phase is desirable.

The first solid material and the second solid material are preferably both present as phase-separated regions of a copolymer, such as a block copolymer. As intended herein, a "block copolymer" means a copolymer containing a linear arrangement of blocks, where each block is defined as a portion of a polymer molecule in which the monomeric units have at least one constitutional or configurational feature absent from the adjacent portions. Segmented block copolymers are preferred, providing two (or more) phases. A liquid is selected to absorb selectively into one of the phases, or potentially in two phases when there are three or more phases present, or generally in less than all of the phases present in the composition. An exemplary segmented copolymer is a urethane-urea copolymer. In some embodiments, a segmented polyurethane includes a microphase-separated structure of fluorinated and non-fluorinated species.

Segmented copolymers are typically created by combining a flexible oligomeric soft segment terminated with an alcohol or amine reactive groups and a multifunctional isocyanate. When the isocyanate is provided in excess relative to the alcohol/amine reactive groups, a viscous prepolymer mixture with a known chain length distribution is formed. This can then be cured to a high-molecular-weight network through the addition of amine or alcohol reactive groups to bring the ratio of isocyanate to amine/alcohol groups to unity. The product of this reaction is a chain backbone with alternating segments: soft segments of flexible oligomers and hard segments of the reaction product of low-molecular-weight isocyanates and alcohol/amines.

Due to the chemical immiscibility of these two phases, the material typically phase-separates on the length scale of these individual molecular blocks, thereby creating a microstructure of flexible regions adjacent to rigid segments strongly associated through hydrogen bonding of the urethane/urea moieties. This combination of flexible and associated elements typically produces a physically crosslinked elastomeric material.

It is also possible to incorporate more than two soft-segment oligomer blocks into a segmented polyurethane system, wherein the separate oligomer block tends to phase-separate on the molecular scale. This can result in more complex microstructures. Depending on relative composition of the various soft segments, discrete or continuous phases may result.

Some variations of the invention provide an anti-fouling segmented copolymer composition comprising:

(a) one or more first soft segments selected from fluoropolymers having an average molecular weight from about 500 g/mol to about 20,000 g/mol, wherein the fluoropolymers are ($\alpha,\omega$)-hydroxyl-terminated, ($\alpha,\omega$)-amine-terminated, and/or ($\alpha,\omega$)-thiol-terminated;

(b) one or more second soft segments selected from polyesters or polyethers, wherein the polyesters or polyethers are ($\alpha,\omega$)-hydroxyl-terminated, ($\alpha,\omega$)-amine-terminated, and/or ($\alpha,\omega$)-thiol-terminated;

(c) one or more isocyanate species possessing an isocyanate functionality of 2 or greater, or a reacted form thereof;

(d) one or more polyol or polyamine chain extenders or crosslinkers, or a reacted form thereof; and (e) a liquid additive disposed in the first soft segments and/or the second soft segments, wherein optionally the first soft segments and the second soft segments are microphase-separated on a microphase-separation length scale from about 0.1 microns to about 500 microns, and wherein optionally the molar ratio of the second soft segments to the first soft segments is less than 2.0.

In some embodiments of the anti-fouling segmented copolymer composition, the fluoropolymers are present in the triblock structure:

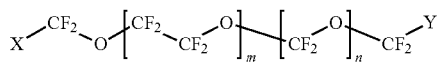

wherein:
X, Y=$CH_2$—(O—$CH_2$—$CH_2$)$_p$-T, and X and Y are independently selected;
p=1 to 50;
T is a hydroxyl, amine, or thiol terminal group;
m=1 to 100; and
n=0 to 100 (in some embodiments, n=1 to 100).

In some embodiments, the liquid additive is a freezing-point depressant for water. For example, the liquid additive may be selected from the group consisting of methanol, ethanol, isopropanol, ethylene glycol, propylene glycol, glycerol, poly(ethylene glycol), polyols, and combinations, isomers, or homologous species thereof. The freezing-point depressant may be aqueous or non-aqueous.

In some embodiments, the liquid additive is a lubricant. For example, the liquid additive may be selected from the group consisting of fluorinated oils, fluorocarbon ether polymers of polyhexafluoropropylene, siloxanes, silicone-based oils, polydimethylsiloxane-poly(ethylene glycol) copolymers, polydimethylsiloxane-fluoropolymer copolymers, petroleum-derived oils (such as mineral oil), plant-derived oils (such as canola oil or soybean oil), and combinations thereof.

In certain embodiments, the liquid additive is a silicone-based oil that includes a graft copolymer having a polydimethylsiloxane (PDMS) backbone with at least one a poly(ethylene glycol) (PEG) sidearm, at least one fluoropolymer (e.g., fluorosilicone) sidearm, or both types of sidearms to create a brush-like graft block copolymer.

The lubricant may be aqueous or non-aqueous. In certain embodiments, the liquid additive is or includes water. When it is desired for water to be selectively disposed in one of the phases, the water may be derived passively from atmospheric humidity, for example. In particular, water absorption may lead to a lubricating surface layer in the presence of humidity, or an ionically conducting surface layer in the presence of humidity, for example.

In some embodiments, the liquid additive is an electrolyte for use in battery or other energy-device applications, which may be aqueous or non-aqueous. For example, the liquid additive may be selected from the group consisting of poly(ethylene glycol), ionic liquids, dissolved salts, dimethyl carbonate, diethyl carbonate, methyl ethyl dicarbonate, and combinations thereof.

In various embodiments, the liquid additive includes alcohol groups, amine groups, thiol groups, or a combination thereof. In these or other embodiments, the liquid additive includes water.

Combinations of liquid additives are possible. In this case, multiple liquids may be selectively disposed in one of the first or second solid materials. Alternatively, or additionally, a first liquid may be selectively disposed in one of the first or second solid materials, and a second liquid may be selectively disposed in the second or first (i.e., the other) solid material. For example, a first liquid may be an organic material that selectively swells the first soft segments, and a second liquid may be water that is selectively disposed in the second soft segments (e.g., a hygroscopic phase). The first liquid could be, for example, mineral oil to improve lubricity and bugphobicity. As another example, a first liquid could electrical or ionic conductivity in a continuous phase (first soft segments), while a second liquid adjusts lubrication or water freezing properties of second soft segments.

The liquid additive, or combination of multiple liquid additives, may be present in the composition at a concentration from about 5 wt % to about 90 wt %, for example. In various embodiments, the liquid, or combination of multiple liquids, is present in the composition at a concentration of about 1 wt %, 2 wt %, 5 wt %, 10 wt %, 20 wt %, 30 wt %, 40 wt %, 50 wt %, 60 wt %, 70 wt %, 80 wt %, 90 wt %, or more.

The liquid additive may be introduced into one of the phases actively, passively, or a combination thereof. In some embodiments, a liquid is actively introduced to a phase by spraying of the liquid, deposition from a vapor phase containing the liquid material, liquid injection, liquid bath immersion, or other techniques. In some embodiments, a liquid is passively introduced to a phase by letting a liquid naturally be extracted from the normal atmosphere, or from a local atmosphere adjusted to contain one or more desired liquids in vapor or droplet (e.g., mist) form.

In certain embodiments, a desired additive is normally a solid at room temperature and is first dissolved or suspended in a liquid that is then disposed in the first or second material of the composition. In certain embodiments, the liquid additive further contains a solid lubricant suspended or dissolved in the liquid.

In other certain embodiments, a desired additive is normally a solid at room temperature and is first melted to produce a liquid that is then disposed in the composition. Within the composition, the desired additive may partially or completely solidify back to a solid, or may form a multiphase material, for example. Thus in certain embodiments, the composition includes at least one additive selectively disposed in either of the first soft segments or the second soft segments, wherein the additive may be derived from a solid, liquid, or vapor, and wherein the additive, when present in the composition, may be in liquid or dissolved form.

Optionally, the liquid additive contains solid particles (that are solid at a temperature of 25° C. and 1 bar pressure) suspended or dissolved in the liquid additive. For example, the liquid additive may contain solid lubricant particles suspended or dissolved in the liquid. A "solid lubricant" reduces friction of an object or particle that is sliding along the surface of a coating containing the material. A solid lubricant aids the sliding of debris (e.g., bug fragments, dirt, ice, etc.) across the surface. Exemplary solid lubricants include graphite and molybdenum disulfide. Solid particles may be included in the liquid for other reasons, such as for coating strength or durability, or to enhance absorption of the liquid into the selected phase, for example.

A possible shortcoming to a low-molecular-weight liquid additive that swells one or both phases is the potential for steady loss of the liquid over time, such as due to leakage or volatility. This loss can be accelerated due to environmental effects such as exposure to rain, wind, sand, or acceleration of the vehicle onto which the coating is applied. Temporal degradation of physical properties that the liquid confers is undesirable. Some embodiments employ liquid species that can be polymerized or condensed into high-molecular-weight derivatives, while retaining their original performance attributes.

In certain embodiments, low-molecular-weight anti-freeze species such as glycols derive their freezing-point reduction power from the ability of their alcohol groups to interact with the associated H-bonding network of water and frustrate crystallization of bulk water. A similar alcohol-dense surface structure can be created by condensing a network that polymerizes and gels, providing many free OH groups to interact with water at a surface. In doing so, the surface is able to suppress the potential for inhomogeneous nucleation of ice from liquid water at the surface, thereby lowering the freezing point of the surface water.

Networks with a high density of free alcohol groups dispersed within the base polymer film may be created using sol-gel condensation chemistry. An exemplary method is the condensation of silyl ethers with alcohols or silanol species. In some embodiments, the liquid additive contains one or more precursors capable of condensation curing to form a higher-molecular-weight species. Such precursors may be selected from silanes (e.g., silyl ethers), silanols, alcohols, or combinations thereof. The higher-molecular-weight species may be in the form of a gel. That is, the liquid additive may include or consist essentially of a gel.

In some embodiments, the liquid additive may contain solid particles that function as a freezing-point depressant, wherein the solid particles are suspended or dissolved in the liquid which may then be drawn into the polymer. For example, polyols (e.g., pentaerythritol, dipentaerythritol, or tripentaerythritol) may be dissolved in a solvent, such as methanol, ethanol, glycerol, ethylene glycol, formamide, or water, and then absorbed into the first or second solid material. The high density of OH groups in polyols may be beneficial to disrupt crystallization of water. When solid polyols are employed, they may be melted into the polymer structure, followed by solidification of the polyols within the first or second solid material of the composition.

In some embodiments, a first liquid is selectively disposed in either of the first solid material or the second solid material, and the composition further comprises an additional (second) liquid selectively disposed in the other of the first solid material or the second solid material that does not contain the first liquid.

In some embodiments, the composition is present in an energy-transfer material or an energy-storage material. For example, the liquid may be or include electrolytes, ions, salts, active-battery materials (as a liquid, or dissolved or suspended in a liquid), liquid electrodes, catalysts, ionization agents, intercalation agents, and so on. In some embodiments, the composition is present on an automotive or aerospace vehicle.

Many potential liquid additives contain reactive groups that unintentionally react with chemical groups contained in the polymer precursors. Therefore, in some cases, there exists a fundamental incompatibility of liquid species in the resin during chemical synthesis and polymerization. Addition of reactive liquid additives into the reaction mixture during synthesis can dramatically alter stoichiometry and backbone structure, while modifying physical and mechanical properties. One strategy to circumvent this problem is to block the reactive groups (e.g., alcohols, amines, and/or thiols) in the liquid additive with chemical protecting groups to render them inert to reaction with other reactive chemical groups (e.g., isocyanates) in the coating precursors.

In particular, it is possible to temporarily block a reactive position by transforming it into a new functional group that will not interfere with the desired transformation. That blocking group is conventionally called a "protecting group." Incorporating a protecting group into a synthesis requires at least two chemical reactions. The first reaction transforms the interfering functional group into a different one that will not compete with (or compete at a lower reaction rate with) the desired reaction. This step is called protection. The second chemical step transforms the protecting group back into the original group at a later stage of synthesis. This latter step is called deprotection.

In some embodiments in which the liquid additive contains alcohol, amine, and/or thiol groups, the liquid additive thus contains chemical protecting groups to prevent or inhibit reaction of the alcohol, amine, and/or thiol groups with isocyanates. The protecting groups may be designed to undergo deprotection upon reaction with atmospheric moisture, for example (further discussed below).

In the case of the liquid additive containing alcohol groups, the protecting groups may be selected from the silyl ether class of alcohol protecting groups. For example, the protecting groups may be selected from the group consisting of trimethylsilyl ether, isopropyldimethylsilyl ether, tert-butyldimethylsilyl ether, tert-butyldiphenylsilyl ether, tribenzylsilyl ether, triisopropylsilyl ether, and combinations thereof. In these or other embodiments, the protecting groups to protect alcohol may be selected from the group consisting of 2,2,2-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, and combinations thereof.

In the case of the liquid additive containing amine groups, the protecting groups may be selected from the carbamate class of amine protecting groups, such as (but not limited to) vinyl carbamate. Alternatively, or additionally, the protecting groups may be selected from the ketamine class of amine protecting groups. In these or other embodiments, the protecting groups to protect amine may be selected from the group consisting of 1-chloroethyl carbamate, 4-methoxybenzenesulfonamide, acetamide, benzylamine, benzyloxy carbamate, formamide, methyl carbamate, trifluoroacetamide, tert-butoxy carbamate, and combinations thereof.

In the case of the liquid additive containing thiol groups, the protecting groups may be selected from S-2,4-dinitrophenyl thioether and/or S-2-nitro-1-phenylethyl thioether, for example.

Preferred protecting groups are configured such that they can be introduced to the liquid additive (or a molecule contained therein), which is added to the reaction mixture. The liquid additive then preferably remains inert during film synthesis and fabrication, after which the liquid additive deprotects itself to yield the original molecule in the liquid additive. Preferably, the deprotection step provides a high yield (e.g., at least 75 wt %, 85 wt %, 95 wt %, or 99 wt %) back to the original group in the liquid additive. Traces of the protecting group may remain in the final polymer.

The typical reaction mechanism when water is the deprotecting reagent is simple hydrolysis. Water is often nucleophilic enough to kick of a leaving group and deprotect a species. One example of this is the protection of an amine with a ketone to form a ketamine. These can be mixed with isocyanates when the amine alone would react so quickly as to not be able to be practically mixed. Instead the ketamine reagent is inert but after mixing and casting as a film, atmospheric moisture will diffuse into the coating, remove the ketone (which vaporizes itself) and leaves the amine to rapidly react with neighboring isocyanates in situ.

Many deprotecting agents require high pH, low pH, or redox chemistry to work. However, some protecting groups are labile enough that water alone is sufficient to cause deprotection. When possible, a preferred strategy to spontaneously deprotect the molecules is through reaction with atmospheric moisture, such as an atmosphere containing from about 10% to about 90% relative humidity at ambient temperature and pressure. A well-known example is the room-temperature vulcanization of silicones. These systems have silyl ethers that are deprotected with moisture and in doing so the free Si—OH reacts with other silyl ethers to create Si—O—Si covalent bonds, forming a network.

In other embodiments, a chemical deprotection step is actively conducted, such as by introducing a deprotection agent and/or adjusting mixture conditions such as temperature, pressure, pH, solvents, electromagnetic field, or other parameters.

This specification hereby incorporates by reference herein Greene and Wuts, *Protective Groups in Organic Synthesis*, Fourth Edition, John Wiley & Sons, New York, 2007, for its teachings of the role of protecting groups, synthesis of protecting groups, and deprotection schemes including for example adjustment of pH by addition of acids or bases, to cause deprotection.

Some variations of the invention provide an anti-fouling segmented copolymer precursor composition comprising:

(a) one or more first soft segments selected from fluoropolymers having an average molecular weight from about 500 g/mol to about 20,000 g/mol, wherein the fluoropolymers are (α,ω)-hydroxyl-terminated, (α,ω)-amine-terminated, and/or (α,ω)-thiol-terminated;

(b) one or more second soft segments selected from polyesters or polyethers, wherein the polyesters or polyethers are (α,ω)-hydroxyl-terminated, (α,ω)-amine-terminated, and/or (α,ω)-thiol-terminated;

(c) one or more isocyanate species possessing an isocyanate functionality of 2 or greater, or a reacted form thereof;

(d) one or more polyol or polyamine chain extenders or crosslinkers, or a reacted form thereof; and (e) a liquid additive precursor disposed in the first soft segments and/or the second soft segments, wherein the liquid additive precursor includes a protecting group, wherein optionally the molar ratio of the second soft segments to the first soft segments is less than 2.0.

In the precursor composition, the first soft segments and the second soft segments may be microphase-separated on a microphase-separation length scale from about 0.1 microns to about 500 microns, in some embodiments.

In some embodiments, the liquid additive precursor includes alcohol groups and at least one protecting group that protects the alcohol groups from reacting with the anti-fouling segmented copolymer precursor composition. For example, the protecting group may be selected from the group consisting of trimethylsilyl ether, isopropyldimethylsilyl ether, tert-butyldimethylsilyl ether, tert-butyldiphenylsilyl ether, tribenzylsilyl ether, triisopropylsilyl ether, 2,2,2-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, and combinations thereof.

In some embodiments, the liquid additive precursor includes amine groups and at least one protecting group that protects the amine groups from reacting with the anti-fouling segmented copolymer precursor composition. For example, the protecting group may be selected from the group consisting of vinyl carbamate, 1-chloroethyl carbamate, 4-methoxybenzenesulfonamide, acetamide, benzylamine, benzyloxy carbamate, formamide, methyl carbamate, trifluoroacetamide, tert-butoxy carbamate, aldehydes, ketones, and combinations thereof.

In some embodiments, the liquid additive precursor includes thiol groups and at least one protecting group that protects the thiol groups from reacting with the anti-fouling segmented copolymer precursor composition. For example, protecting group may be selected from S-2,4-dinitrophenyl thioether, S-2-nitro-1-phenylethyl thioether, or a combination thereof.

The liquid additive precursor may include a protecting group that is capable of deprotecting the liquid additive precursor in the presence of atmospheric moisture.

In some embodiments, the liquid additive precursor is capable of condensation curing to increase its molecular weight. For example, the liquid additive precursor may include a silane, a silyl ether, a silanol, an alcohol, or a combination or reaction product thereof.

The liquid additive precursor may be present in the composition at a concentration from about 1 wt % to about 75 wt %, such as about 5 wt %, 10%, 20 wt %, 30 wt %, 40 wt %, 50 wt %, 60 wt %, or 70 wt %, for example.

The anti-fouling compositions of variations of the invention will now be further described.

In some embodiments, one of the first soft segments and the second soft segments is hydrophobic, and the other is hydrophilic or hygroscopic. In certain embodiments, a continuous matrix (first soft segments) is hygroscopic or further includes a hygroscopic material. In these or other embodiments, discrete inclusions (second soft segments) are hygroscopic or further include a hygroscopic material.

As intended in this patent application, "hygroscopic" means that the material is capable of attracting and holding water molecules from the surrounding environment. The water uptake of various polymers is described in Thijs et al., "Water uptake of hydrophilic polymers determined by a thermal gravimetric analyzer with a controlled humidity chamber" *J. Mater. Chem.* (17) 2007, 4864-4871, which is hereby incorporated by reference herein. In some embodiments, the hygroscopic material is characterized by a water absorption capacity, at 90% relative humidity and 30° C., of at least 5, 10, 15, 20, 25, 30, 35, 40, 45, or 50 wt % uptake of $H_2O$.

In some embodiments, one of the first soft segments and second soft segments is oleophobic. An oleophobic material has a poor affinity for oils. As intended herein, the term "oleophobic" means a material with a contact angle of hexadecane greater than 90°. An oleophobic material may also be classified as lipophobic.

In some embodiments, one of the first soft segments and the second soft segments may be a "low-surface-energy polymer" which means a polymer, or a polymer-containing material, with a surface energy of no greater than 50 $mJ/m^2$. In some embodiments, one of the first soft segments and the second soft segments has a surface energy from about 5 $mJ/m^2$ to about 50 $mJ/m^2$.

The first soft segments or the second soft segments may be or include a fluoropolymer, such as (but not limited to) a fluoropolymer selected from the group consisting of polyfluoroethers, perfluoropolyethers, fluoroacrylates, fluorosilicones, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof.

In these or other embodiments, the first soft segments or the second soft segments may be or include a siloxane. A siloxane contains at least one Si—O—Si linkage. The siloxane may consist of polymerized siloxanes or polysiloxanes (also known as silicones). One example is polydimethylsiloxane.

In some embodiments, the molar ratio of the second soft segments to the first soft segments is about 2.0 or less. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

It is noted that ($\alpha,\omega$)-terminated polymers are terminated at each end of the polymer. The $\alpha$-termination may be the same or different than the $\omega$-termination on the opposite end. The fluoropolymers and/or the polyesters or polyethers may terminated with a combination of hydroxyl groups, amine groups, and thiol groups, among other possible termination groups. Note that thiols can react with an —NCO group (usually catalyzed by tertiary amines) to generate a thiourethane.

Also it is noted that in this disclosure, "($\alpha,\omega$)-termination" includes branching at the ends, so that the number of terminations may be greater than 2 per polymer molecule. The polymers herein may be linear or branched, and there may be various terminations and functional groups within the polymer chain, besides the end ($\alpha,\omega$) terminations.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, $\alpha,\omega$-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate. "Isocyanate functionality" refers to the number of isocyanate reactive sites on a molecule. For example, diisocyanates have two isocyanate reactive sites and therefore an isocyanate functionality of 2. Triisocyanates have three isocyanate reactive sites and therefore an isocyanate functionality of 3.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis (phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender or crosslinker may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof. In some embodiments, polymeric forms of polyol chain extenders or crosslinkers are utilized, typically hydrocarbon or acrylic backbones with hydroxyl groups distributed along the side groups.

The one or more chain extenders or crosslinkers (or reaction products thereof) may be present in a concentration, in the segmented copolymer composition, from about 0.01 wt % to about 25 wt %, such as from about 0.05 wt % to about 10 wt %.

The first soft segments may be present in a concentration from about 5 wt % to about 95 wt % based on total weight of the composition. In various embodiments, the first soft segments may be present in a concentration of about 5, 10, 20, 30, 40, 50, 60, 70, 80, 90, or 95 wt % based on total weight of the composition.

The second soft segments may be present in a concentration from about 5 wt % to about 95 wt % based on total weight of the composition. In various embodiments, the second soft segments may be present in a concentration of about 5, 10, 20, 30, 40, 50, 60, 70, 80, 90, or 95 wt % based on total weight of the composition.

In some embodiments, fluorinated polyurethane oligomers are terminated with silane groups. The end groups on the oligomers (in the prepolymer) may be modified from isocyanate to silyl ethers. This can be accomplished through reaction of an isocyanate-reactive silane species (e.g., aminopropyltriethoxysilane) to provide hydrolysable groups well-known in silicon and siloxane chemistry. Such an approach eliminates the need for addition of a stoichiometric amount of curative to form strongly associative hard segments, while replacing the curative with species that possess the ability to form a covalently crosslinked network under the influence of moisture or heat. Such chemistry has been shown to preserve beneficial aspects of urethane coatings while boosting scratch resistance.

In addition, the reactivity of the terminal silane groups allows for additional functionality in the form of complimentary silanes blended with the prepolymer mixture. The silanes are able to condense into the hydrolysable network upon curing. This strategy allows for discrete domains of distinct composition. A specific embodiment relevant to anti-fouling involves the combination of fluoro-containing urethane prepolymer that is endcapped by silane reactive groups with additional alkyl silanes.

The microphase-separated microstructure containing the first and second soft segments may be characterized as an inhomogeneous microstructure. As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example. The length scale of phase inhomogeneity may refer to the average size (e.g., effective diameter) of discrete inclusions of one phase dispersed in a continuous phase. The length scale of phase inhomogeneity may refer to the average center-to-center distance between nearest-neighbor inclusions of the same phase. The length scale of phase inhomogeneity may alternatively refer to the average separation distance between nearest-neighbor regions of the discrete (e.g., droplets) phase, where the distance traverses the continuous phase.

The average length scale of phase inhomogeneity may generally be from about 0.1 microns to about 500 microns, which in this disclosure is also generally referred to as "microphase separation." In some embodiments, the average length scale of phase inhomogeneity is from about 0.5 microns to about 100 microns, such as about 1 micron to about 50 microns. In various embodiments, the average length scale of phase inhomogeneity is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity may be present on a length scale less than 0.1 micron or greater than 500 microns (e.g., about 1000 microns), with the overall average falling in the range of 0.1-500 microns. Note that in this disclosure, "about 0.1 microns" is intended to encompass 0.05-0.149 microns (50-149 nanometers), i.e. ordinary rounding.

This phase inhomogeneity typically causes opaque coatings or films due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-700 nm, a clear or transparent coating must typically keep variations in index of refraction below about 50 nm in length. As phase inhomogeneities increase in length scale, the opacity of the material rises. Phase inhomogeneities with average length scale from 0.1 μm to 500 μm are expected to drive significant scattering in the material, leading to opaque structures above 25 μm in thickness—unless the multiple phases happen to be refractive index-matched. See Althues et al., "Functional inorganic nanofillers for transparent polymers" *Chem. Soc. Rev.*, 2007, 36, 1454-1465, which is hereby incorporated by reference herein for its teaching that materials with inhomogeneity below 50 nm will tend to be clear, and materials with inhomogeneity above 50 nm (0.05 μm) will tend to be more opaque.

In preferred embodiments, the first soft segments and second soft segments are microphase-separated on a length scale from about 0.1 microns to about 500 microns. Therefore, these compositions tend to be non-transparent—unless there is refractive index matching of the first soft segments and second soft segments (and absorbed liquid when in a significant concentration). In some embodiments, the composition is opaque with respect to ordinary light. In certain embodiments, the composition is semi-transparent or transparent with respect to ordinary light.

The composition may also be characterized by hierarchical phase separation. For example, the first soft segments and the second soft segments, in addition to being microphase-separated, are typically nanophase-separated. As intended herein, two materials being "nanophase-separated" means that the two materials are separated from each other on a length scale from about 1 nanometer to about 100 nanometers. For example, the nanophase-separation length scale may be from about 10 nanometers to about 100 nanometers.

The nanophase-separation length scale is hierarchically distinct from the microphase-separation length scale. With traditional phase separation in block copolymers, the blocks chemically segregate at the molecular level, resulting in regions of segregation on the length scale of the molecules, such as a nanophase-separation length scale from about 10 nanometers to about 100 nanometers. Again see Petrovic et al., "POLYURETHANE ELASTOMERS" *Prog. Polym. Sci.*, Vol. 16, 695-836, 1991. The extreme difference of the two soft segments means that in the reaction pot the soft segments do not mix homogeneously and so create discrete region that are rich in fluoropolymer or rich in non-fluoropolymer (e.g., PEG) components, distinct from the molecular-level segregation. These emulsion droplets contain a large amount of polymer chains and are thus in the micron length-scale range. These length scales survive the curing process, so that the final material contains the microphase separation that was set-up from the emulsion, in addition to the molecular-level (nanoscale) segregation.

In some embodiments, therefore, the larger length scale of separation (0.1-500 microns) is driven by an emulsion process, which provides microphase separation that is in addition to classic molecular-level phase separation. Chen et al., "Structure and morphology of segmented polyurethanes: 2. Influence of reactant incompatibility" POLYMER, 1983, Vol. 24, pages 1333-1340, is hereby incorporated by reference herein for its teachings about microphase separation that can arise from an emulsion-based procedure.

In some embodiments, the nanophase-scale separation is on the length scale of microstructure domains that include (1) a fluid-resistant, chemically inert, hydrophobic soft segment; (2) a hygroscopic (water-absorbing) and/or liquid-swellable soft segment; and (3) a rigid, highly associated hard segment that provides network reinforcement and stability. In a composition possessing hierarchical phase separation, a first microphase may contain nanophases of hydrophobic soft segment along with nanophases of hard segment, while a second microphase may contain nanophases of hygroscopic soft segment along with nanophases of hard segment. Without being limited by speculation, it is believed that in the CLSM images of FIGS. 3A, 3B, 4A, 4B, 5A, and 5B, the dark regions are microphases that contain hydrophobic soft segments and highly associated hard segments, each being nanophase-separated; and the light regions are microphases that contain hygroscopic soft segments and highly associated hard segments, also each being nanophase-separated.

In some embodiments, discrete inclusions have an average size (e.g., effective diameter) from about 50 nm to about 150 μm, such as from about 100 nm to about 100 μm. In various embodiments, discrete inclusions have an average size (e.g., effective diameter) of about 50 nm, 100 nm, 200 nm, 500 nm, 1 μm, 2 μm, 5 μm, 10 μm, 50 μm, 100 μm, or 200 μm.

In these or other embodiments, discrete inclusions have an average center-to-center spacing between adjacent inclusions, through a continuous matrix, from about 50 nm to about 150 μm, such as from about 100 nm to about 100 μm. In various embodiments, discrete inclusions have an average center-to-center spacing between adjacent inclusions of about 50 nm, 100 nm, 200 nm, 500 nm, 1 μm, 2 μm, 5 μm, 10 μm, 50 μm, 100 μm, or 200 μm.

The composition may be characterized by a transparency of less than 70% average light transmission in the wavelength range of 400 nm to 700 nm, through a 1-millimeter-thick sample (defined test depth). In some embodiments, the composition transparency is less than about 65%, 60%, 55%, 50%, 45%, 40%, 35%, 30%, 25%, 20%, 15%, or 10% average light transmission in the wavelength range of 400 nm to 700 nm, through a 1-millimeter-thick sample.

In some variations of the invention, the composition forms a coating disposed on a substrate. The coating may have a thickness from about 1 μm to about 10 mm, for example. In various embodiments, the coating thickness is about 100 nm, 1 μm, 10 μm, 100 μm, 1 mm, or 10 mm. Thicker coatings provide the benefit that even after surface abrasion, the coating still functions because the entire depth of the coating (not just the outer surface) contains the first and second solid materials. The coating substrate composition and thickness will depend on the specific application.

The composition may be present in an anti-fouling coating, such as (but not limited to) an anti-ice coating, an anti-bug coating, an anti-friction coating and/or an anti-corrosion coating. The composition may also be present in an anti-fouling layer, an anti-fouling object, or an anti-fouling material. In some embodiments, the anti-fouling composition is not disposed on or adjacent to a substrate.

Figure 2:
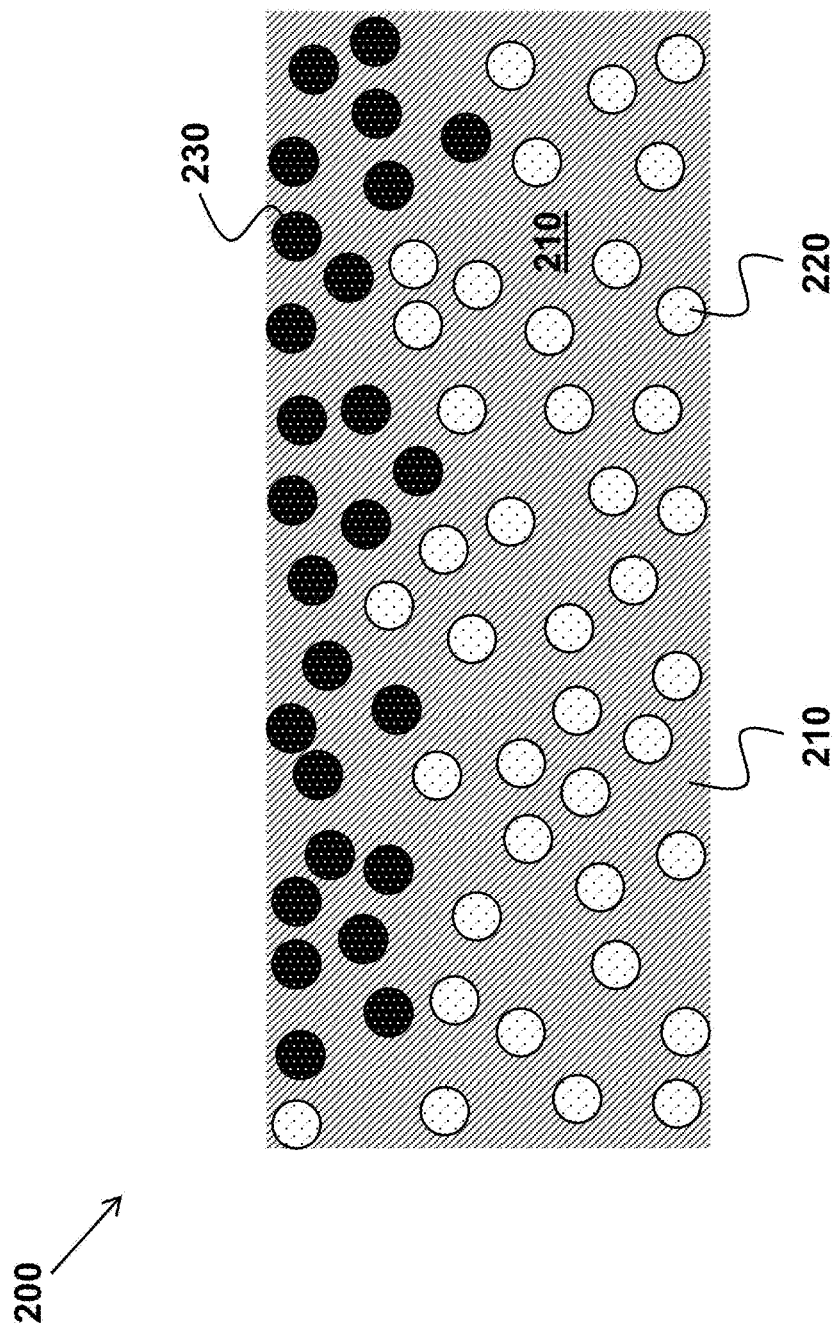
FIG. 2 depicts a composition comprising a first solid material and a second solid material that are microphase-separated, and a liquid selectively disposed in either of the first solid material or the second solid material, in some embodiments.

Various embodiments are depicted in the drawings of FIGS. 1 and 2, which should not be construed to limit the invention. These drawings are for illustration purposes and are not to scale. The drawings of FIGS. 1 and 2 are two-dimensional cross-sections, as a side view. The top of each structure represents the surface that is exposed to the environment.

In FIG. 1, the structure 100 includes a continuous matrix 120 and a plurality of discrete inclusions 110 (e.g., first soft segments) dispersed throughout the continuous matrix 120 (e.g., second segments). While FIG. 1 depicts (for illustration) the discrete inclusions 110 as circles/spheres, this is not meant to imply a limitation. Other geometries of discrete inclusions 110 are possible, including regular or irregular shapes, as well as various sizes and size distributions. The inclusions 110 may vary in size, such as from about 0.1 to 500 microns in diameter or effective diameter. The inclusions 110 may be dispersed uniformly (e.g., ordered) or non-uniformly (e.g., randomly). The number of inclusions 110 per unit volume may vary, such that the inclusions 110 collectively are present in a concentration from about 5 wt % to about 95 wt % based on total weight of the composition, for example.

A liquid 130 is disposed in (e.g., absorbed into) a portion of continuous matrix 120, which functions as a reservoir for the absorbed liquid 130 (e.g., water, lubricant, electrolyte, etc.). In FIG. 1, the continuous matrix absorbs the liquid selectively, compared to any liquid absorption into the discrete inclusions. FIG. 1 implies that the continuous matrix 120 near the surface contains liquid 130, while the continuous matrix 120 in the distal region from the surface (e.g., closer to a substrate material) does not contain a significant amount of liquid. This could be due to the fact that the total amount of liquid that has been absorbed is below the maximum capacity of the continuous matrix 120, or because FIG. 1 is a snapshot in time, for example. It should be understood that more liquid may continue to be disposed into the continuous matrix 120.

Some variations of the invention are depicted in FIG. 2, which is an alternative configuration compared to FIG. 1. In particular, in FIG. 2, the inclusions absorb the liquid selectively, compared to any liquid absorption into the continuous matrix.

In FIG. 2, the structure 200 includes a continuous matrix 210 and a plurality of discrete inclusions 220 dispersed throughout the continuous matrix 210. While FIG. 2 depicts (for illustration) the discrete inclusions 210 as circles/spheres, this is not meant to imply a limitation. Other geometries of discrete inclusions 210 are possible, including regular or irregular shapes, as well as various sizes and size distributions. The inclusions 210 may vary in size, such as from about 0.1 to 500 microns in diameter or effective diameter. The inclusions 210 may be dispersed uniformly (e.g., ordered) or non-uniformly (e.g., randomly). The number of inclusions 210 per unit volume may vary, such that the inclusions 210 collectively are present in a concentration from about 5 wt % to about 95 wt % based on total weight of the composition, for example.

A liquid is disposed in a portion of the discrete inclusions 220, which function as reservoirs for the absorbed liquid 230. FIG. 2 implies that most of the discrete inclusions 220 near the surface contain liquid to therefore become liquid-containing inclusions 230, while the inclusions 220 in the distal region from the surface (e.g., closer to a substrate material) of the continuous matrix 210 do not contain a significant amount of liquid. This could be due to the fact that the total amount of liquid that has been deposited is below the maximum capacity of the plurality of inclusions 220 that are present, or because FIG. 2 is a snapshot in time, for example. It should be understood that more liquid may continue to be disposed into the inclusions 230.

Besides the desired liquid, other liquid contaminants may strike the surface of structure 100 or 200. Solid contaminants such as dust, dirt, or insects may also strike the surface of structure 100 or 200. Vapor contaminants such as oil vapor, water vapor, or smoke may also strike the surface of structure 100 or 200. Depending on the impacting material, the contaminant can become absorbed in the two phases or in one of the phases selectively.

An optional substrate (not shown) may be disposed on the back side of the material, at the bottom of FIGS. 1 and 2. A substrate will be present when the material forms a coating or a portion of a coating (e.g., one layer of a multilayer coating). Many substrates are possible, such as a metal, polymer, or glass substrate. Other layers may be present, within the substrate or on the opposite (relative to the coating) side of the substrate. Such other layers may include, for example, metallic layers, conductive layers, and adhesive layers.

Various strategies to form the materials of FIG. 1 or 2 are possible, as will be appreciated by a skilled artisan.

Prior to formation of the final coatings, the composition may be regarded as a precursor composition. The precursor composition may be waterborne, solventborne, or a combination thereof. In waterborne embodiments, the first or second soft segments may be derived from an aqueous dispersion of a linear crosslinkable polyurethane containing charged groups, and the other soft segments may be derived from a crosslinking agent containing charged groups, for example.

Some variations provide a method of making an anti-fouling segmented copolymer, the method comprising:

(a) generating a reaction mixture comprising (i) fluoropolymers, (ii) polyesters or polyethers, (iii) isocyanate species, and (iv) polyol or polyamine chain extenders or crosslinkers;

(b) introducing a liquid additive precursor into the reaction mixture, wherein the liquid additive precursor includes a liquid additive and a protecting group that protects the liquid additive from reacting with the fluoropolymers, the polyesters or polyethers, the isocyanate species, or the polyol or polyamine chain extenders or crosslinkers;

(c) subjecting the reaction mixture to effective reaction conditions (including a suitable time and temperature) to generate a segmented copolymer comprising (i) one or more first soft segments containing the fluoropolymers, (ii) one or more second soft segments containing the polyesters or polyethers, (iii) hard segments containing a reaction product of the isocyanates and the polyol or polyamine chain extenders or crosslinkers;

(d) deprotecting at least some of the liquid additive precursor by removing the protecting group, thereby generating the liquid additive admixed with the segmented copolymer; and (e) recovering an anti-fouling segmented copolymer containing the segmented copolymer and the liquid additive.

In some embodiments, the liquid additive precursor is disposed in the first soft segments and/or the second soft segments. The liquid additive (i.e., following deprotection of the liquid additive precursor) may be disposed in the first soft segments and/or the second soft segments.

In step (c), the molar ratio of the second soft segments to the first soft segments may be less than 2.0, following reaction, in some embodiments.

The first soft segments and the second soft segments may be microphase-separated on a microphase-separation length scale from about 0.1 microns to about 500 microns, before deprotection in step (d) and/or following deprotection.

In some embodiments, the liquid additive precursor includes alcohol groups, and the protecting group protects the alcohol groups. In some embodiments, the liquid additive precursor includes amine groups, and the protecting group protects the amine groups. In some embodiments, the liquid additive precursor includes thiol groups, and the protecting group protects the thiol groups.

In certain methods, deprotecting in step (d) is carried out in the presence of atmospheric moisture or within a humidity chamber, for example.

Other variations provide a method of making an anti-fouling segmented copolymer, the method comprising:

(a) generating a reaction mixture comprising (i) fluoropolymers, (ii) polyesters or polyethers, (iii) isocyanate species, and (iv) polyol or polyamine chain extenders or crosslinkers;

(b) introducing a liquid additive precursor into the reaction mixture, wherein the liquid additive precursor is capable of condensation curing to increase its molecular weight;

(c) subjecting the reaction mixture to effective reaction conditions (including a suitable time and temperature) to generate a segmented copolymer comprising (i) one or more first soft segments containing the fluoropolymers, (ii) one or more second soft segments containing the polyesters or polyethers, (iii) hard segments containing a reaction product of the isocyanates and the polyol or polyamine chain extenders or crosslinkers;

(d) during or after step (c), condensation curing the liquid additive precursor to generate a liquid additive admixed with the segmented copolymer, wherein the liquid additive has a higher molecular weight than the liquid additive precursor; and (e) recovering an anti-fouling segmented copolymer containing the segmented copolymer and the liquid additive.

The liquid additive precursor may be disposed in the first soft segments and/or the second soft segments. Following deprotection, the liquid additive may be disposed in the first soft segments and/or the second soft segments.

In step (c), the molar ratio of the second soft segments to the first soft segments may be less than 2.0, in some embodiments.

The first soft segments and the second soft segments may be microphase-separated on a microphase-separation length scale from about 0.1 microns to about 500 microns, before deprotection in step (d) and/or following deprotection.

In some embodiments, the liquid additive precursor includes a silane, a silyl ether, a silanol, an alcohol, or a combination or reaction product thereof, and the liquid additive precursor further includes a protecting group that protects the liquid additive precursor from reacting with the fluoropolymers, the polyesters or polyethers, the isocyanate species, or the polyol or polyamine chain extenders or crosslinkers.

In some embodiments, a non-reactive liquid additive is introduced directly to a reaction mixture before casting and curing, and/or directly to the cured segmented copolymer. In these embodiments, the liquid additive, since it is non-reactive, does not need to be protected and is not polymerized or cured in situ. One example of a non-reactive liquid additive is high-molecular-weight silicone oil, such as one containing polydimethylsiloxane with molecular weight above 10,000 g/mol.

Some embodiments employ waterborne polyurethane dispersions. A successful waterborne polyurethane dispersion often requires the specific components to contain ionic groups to aid in stabilizing the emulsion. Other factors contributing to the formulation of a stable dispersion include the concentration of ionic groups, concentration of water or solvent, and rate of water addition and mixing during the inversion process. An isocyanate prepolymer may be dispersed in water. Subsequently, a curative component may be dispersed in water. Water evaporation then promotes the formation of a microphase-separated polyurethane material as the precursor composition.

The composition or precursor composition may generally be formed from a precursor material (or combination of materials) that may be provided, obtained, or fabricated from starting components. The precursor material is capable of hardening or curing in some fashion, to form a precursor composition containing the first soft segments and second soft segments, microphase-separated on a microphase-separation length scale from about 0.1 microns to about 500 microns. The precursor material may be a liquid; a multiphase liquid; a multiphase slurry, emulsion, or suspension; a gel; or a dissolved solid (in solvent), for example.

In some embodiments of the invention, an emulsion sets up in the reaction mixture based on incompatibility between the two blocks (e.g., PEG and PFPE). The emulsion provides microphase separation in the precursor material. The precursor material is then cured from casting or spraying. The microphase separation survives the curing process (even if the length scales change somewhat during curing), providing the benefits in the final materials (or precursor compositions) as described herein. Without being limited by theory, the microphase separation in this invention is not associated with molecular length-scale separation (5-50 nm) that many classic block-copolymer systems exhibit. Rather, the larger length scales of microphase separation, i.e. 0.1-500 µm, arise from the emulsion that was set-up prior to curing.

Xu et al., "Structure and morphology of segmented polyurethanes: 1. Influence of incompatibility on hard-segment sequence length" *POLYMER,* 1983, Vol. 24, pages 1327-1332 and Chen et al., "Structure and morphology of segmented polyurethanes: 2. Influence of reactant incompatibility" *POLYMER,* 1983, Vol. 24, pages 1333-1340, are each hereby incorporated by reference herein for their teachings about emulsion set-up in polyurethane systems prior to curing.

In some variations of the invention, a precursor material is applied to a substrate and allowed to react, cure, or harden to form a final composition (e.g., coating). In some embodiments, a precursor material is prepared and then dispensed (deposited) over an area of interest. Any known methods to deposit precursor materials may be employed. A fluid precursor material allows for convenient dispensing using spray coating or casting techniques.

The fluid precursor material may be applied to a surface using any coating technique, such as (but not limited to) spray coating, dip coating, doctor-blade coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final composition using any one or more of curing or other chemical reactions, or separations such as removal of solvent or carrier fluid, monomer, water, or vapor. Curing refers to toughening or hardening of a polymeric material by physical crosslinking, covalent crosslinking, and/or covalent bonding of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The liquid (to be incorporated selectively into the first and/or second soft segments) may be added after the cured material is produced. Alternatively, or additionally, and depending on the nature of the liquid, some or all of the liquid may be introduced the precursor material prior to curing and/or during curing, for example.

Periodic replenishment of liquids into the composition may be desired. For example, some or all of the liquid could eventually go away by various mechanisms including vaporization (as discussed above), leaking, solubility into environmental conditions, reaction, and so on. When additional liquid is desired, it may be introduced into one of the phases actively, passively, or a combination thereof. In some embodiments, additional liquid is actively introduced to a phase by spraying of the liquid, deposition from a vapor phase containing the liquid material, liquid injection, liquid bath immersion, or other techniques.

It may also be desirable in certain situations to remove some or all of a liquid from the first or second soft segments. Depending on the nature of the liquid, it may be removed by vaporization (e.g., by heating), gas injection to sweep out the liquid, extraction with another material (e.g., a solvent for the liquid), or a chemical reaction, for example.

EXAMPLES

Materials.

Poly(ethylene glycol) with $M_n$=3,400 g/mol (PEG), 4,4'-methylenebis (cyclohexyl isocyanate) (HMDI), 1,4-butanediol (BD), and dibutyltin dilaurate (DBTDL) are purchased from Sigma Aldrich. Fluorolink D4000 and E10H are purchased from Solvay Specialty Polymers.

Example 1

Preparation of Segmented Copolymer (75% PEG Content) with Microphase-Separated Regions PEG (1.5 mmoles, 5.0 g) and HMDI (9.8 mmoles, 2.57 g) are added into a 3-neck flask equipped with a mechanical stirrer. The reaction flask is placed in a 100° C. oil bath and the reaction is carried out under argon. Once PEG is melted and dissolved in the HMDI, 2 µL of DBTDL is added to the mix. The reaction mixture is stirred at 100° C. for 1 hour. Fluorolink D4000 (0.5 mmoles, 2 g) is added and stirring is continued for another 1 hour. The reaction flask is removed from the 100° C. oil bath, and allowed to cool down before adding THF (10 mL) and BD (7.8 mmoles, 0.71 g) dissolved in THF (2 mL). The sample is sprayed with an airbrush using a 0.5-mm needle nozzle aperture to a thickness of 1-5 mils (about 25-125 microns) on aluminum, glass, and Mylar® (biaxially-oriented polyethylene terephthalate) film.

The polymer network is composed of both a water-absorbing (hydrophilic) and a water-repelling (hydrophobic) material. To investigate the film's network and microphase separation of the opposing materials, confocal microscopy is employed. Confocal microscopy is an optical imaging technique that detects fluorescence by exposing the specimen to light of a certain wavelength to excite fluorescent dyes. Samples are prepared by soaking a thin slice of film in an aqueous solution containing fluorescein (10 to 100 µM), a water-soluble dye, for 24 hours. Water absorbed by the film contains fluorescein, allowing contrast between the hydrophilic and hydrophobic domains. Once removed from the solution, the film is rinsed with DI water to remove excess fluorescein from the surface. The film is quickly pat dried to remove water droplets and placed on a glass slide (75×25 mm). A glass coverslip (0.17 mm thick) is placed firmly on the film and the edges are sealed with a quick cure 5-minute epoxy. The edges are sealed to prevent evaporation of water to allow optimal imaging of the specimen by better matching the refractive index of the glass. The fluorescent imaging is obtained using a Leica SP 5 confocal microscope with an argon laser for an excitation wavelength at 496 nm for fluorescein, giving an emission at 512 nm in water.

Figure 3A:
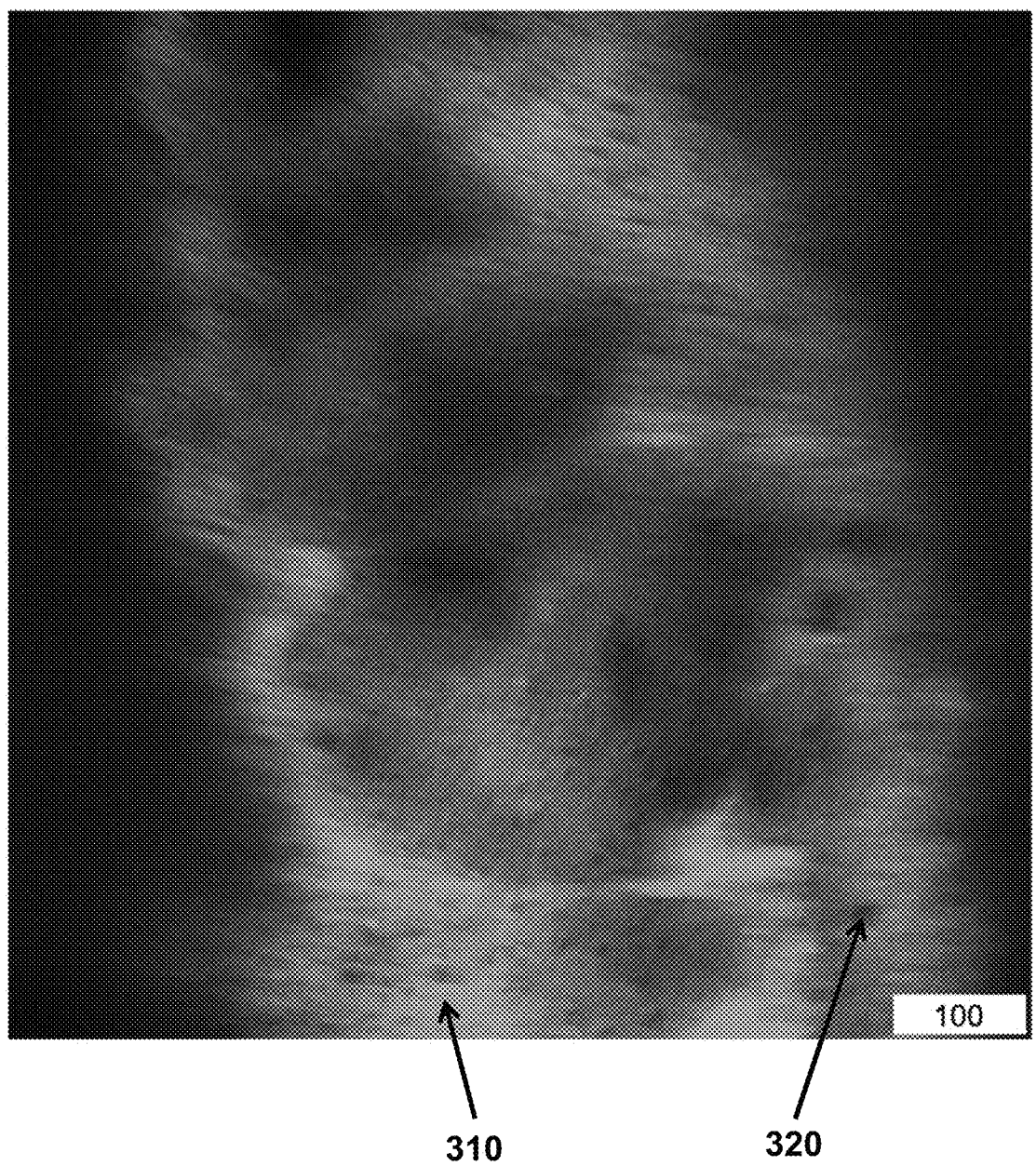
FIG. 3A is a confocal laser scanning microscopy image for the polymer film of Example 1 (scale bar=100 μm).
Figure 3B:
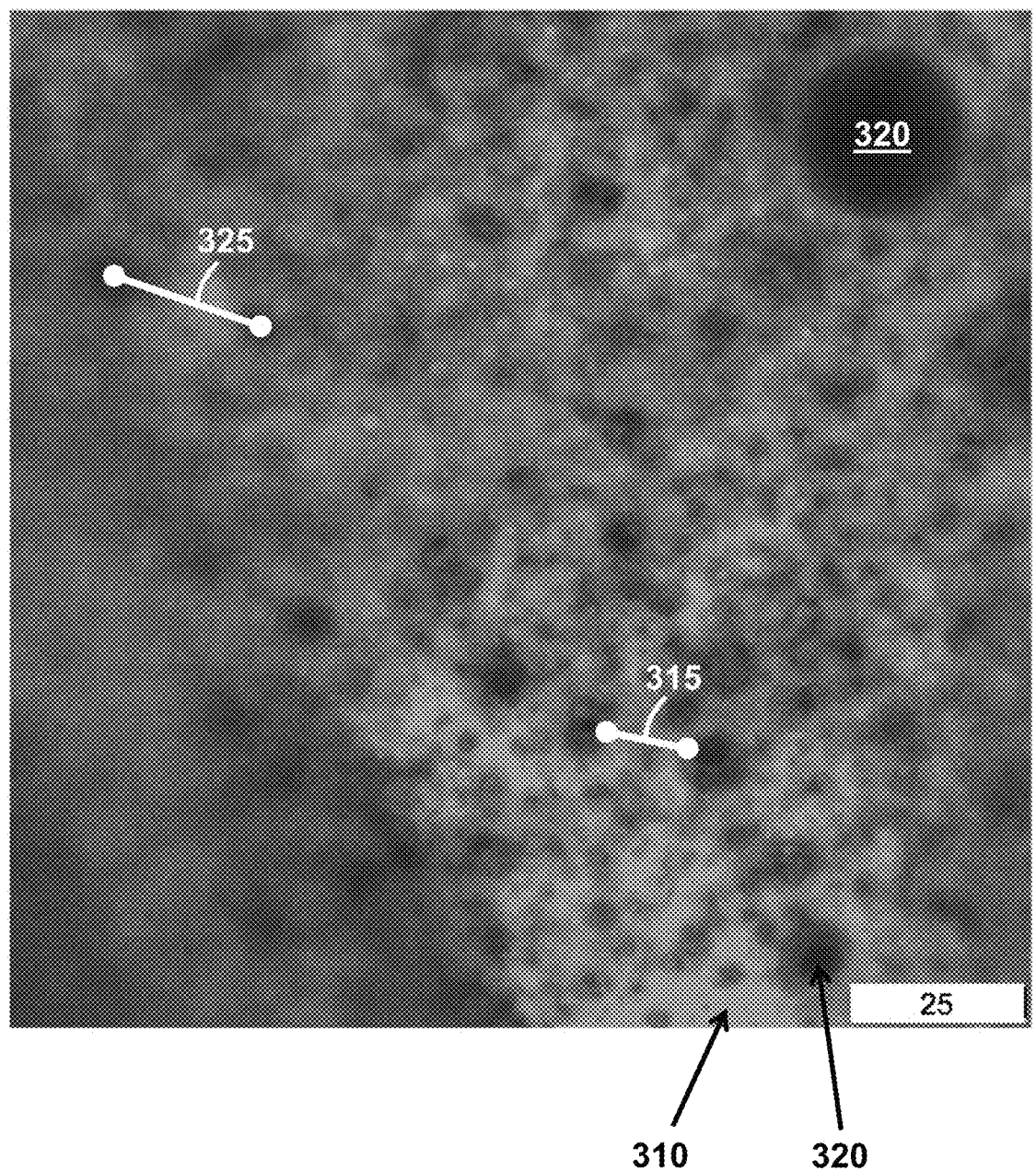
FIG. 3B is a confocal laser scanning microscopy image for the polymer film of Example 1 (scale bar=25 μm).

FIGS. 3A and 3B show confocal laser scanning microscopy (CLSM) images for the polymer film with 75 mol % PEG content. CLSM images are shown at different magnifications of the Example 1 films soaked with water-soluble fluorescent dye.

The fluorescent regions 310 (which display as green regions in the color drawings and lighter regions when reproduced in grayscale) are representative of hydrophilic PEG regions containing a water-soluble fluorescent dye. The inclusions 320 (which display as darker regions) are representative of hydrophobic fluoropolymer regions. The scale bars are 100 µm and 25 µm in FIGS. 3A and 3B, respectively.

Microphase separation is shown in these images. The length scale of phase inhomogeneity for the structure in FIGS. 3A and 3B appears to be in the range of 1 to 100 microns. In particular, the phase inhomogeneity can be characterized by a length scale associated with a discrete phase 320. For example, the length scale of phase inhomogeneity may refer to the average size (e.g., effective diameter) of discrete inclusions of one phase 320 dispersed in a continuous phase 310. The selected (for illustration) inclusions 320 labeled in FIG. 3B have an effective diameter of about 10-20 microns; generally the inclusions have an effective diameter of about 1 to 100 microns in FIGS. 3A and 3B. The length scale of phase inhomogeneity may refer to the average center-to-center distance 325 between nearest-neighbor inclusions of the same phase 320. In FIG. 3B, the selected center-to-center distance 325 is about 25 microns. The length scale of phase inhomogeneity may alternatively refer to the average separation distance 315 between nearest-neighbor regions of the discrete (e.g., droplets) phase 320, i.e. the size of the continuous phase 310 regions. In FIG. 3B, the selected separation distance 315 is about 15 microns. A range of particle sizes and separations is clearly present in this structure; the specific instances of features 310, 315, 320, and 325 were arbitrarily selected.

As described earlier, emulsified droplets rich in either PEG or PFPE are sprayed or cast from a mixture. Upon addition of a curative and the evaporation of a solvent, these droplets coalesce to form a continuous film that is inhomogeneous on the microscale (1-100 µm). In FIGS. 3A and 3B, the dark PFPE-rich areas form a discrete phase (320) that is hydrophobic in character, while the dyed PEG-rich regions form a continuous phase (310) surrounding the discrete regions.

Example 2

Preparation of Segmented Copolymer (50% PEG Content) with Microphase-Separated Regions PEG (1.1 mmoles, 3.83 g) and HMDI (11.2 mmoles, 2.95 g) are added into a 3-neck flask equipped with a mechanical stirrer. The reaction flask is placed in a 100° C. oil bath and the reaction is carried out under argon. Once PEG is melted and dissolved in the HMDI, 2.3 µL of DBTDL is added to the mix. The reaction mixture is stirred at 100° C. for 1 hour. Fluorolink D4000 (1.1 mmoles, 4.5 g) is added and stirring is continued for another 1 hour. The reaction flask is removed from the 100° C. oil bath, and allowed to cool down before adding THF (10 mL) and BD (9.0 mmoles, 0.81 g) dissolved in THF (2 mL). The sample is sprayed with an airbrush using a 0.5-mm needle nozzle aperture to a thickness of 1-5 mils (about 25-125 microns) on aluminum, glass and Mylar® (biaxially-oriented polyethylene terephthalate) film.

Figure 4A:
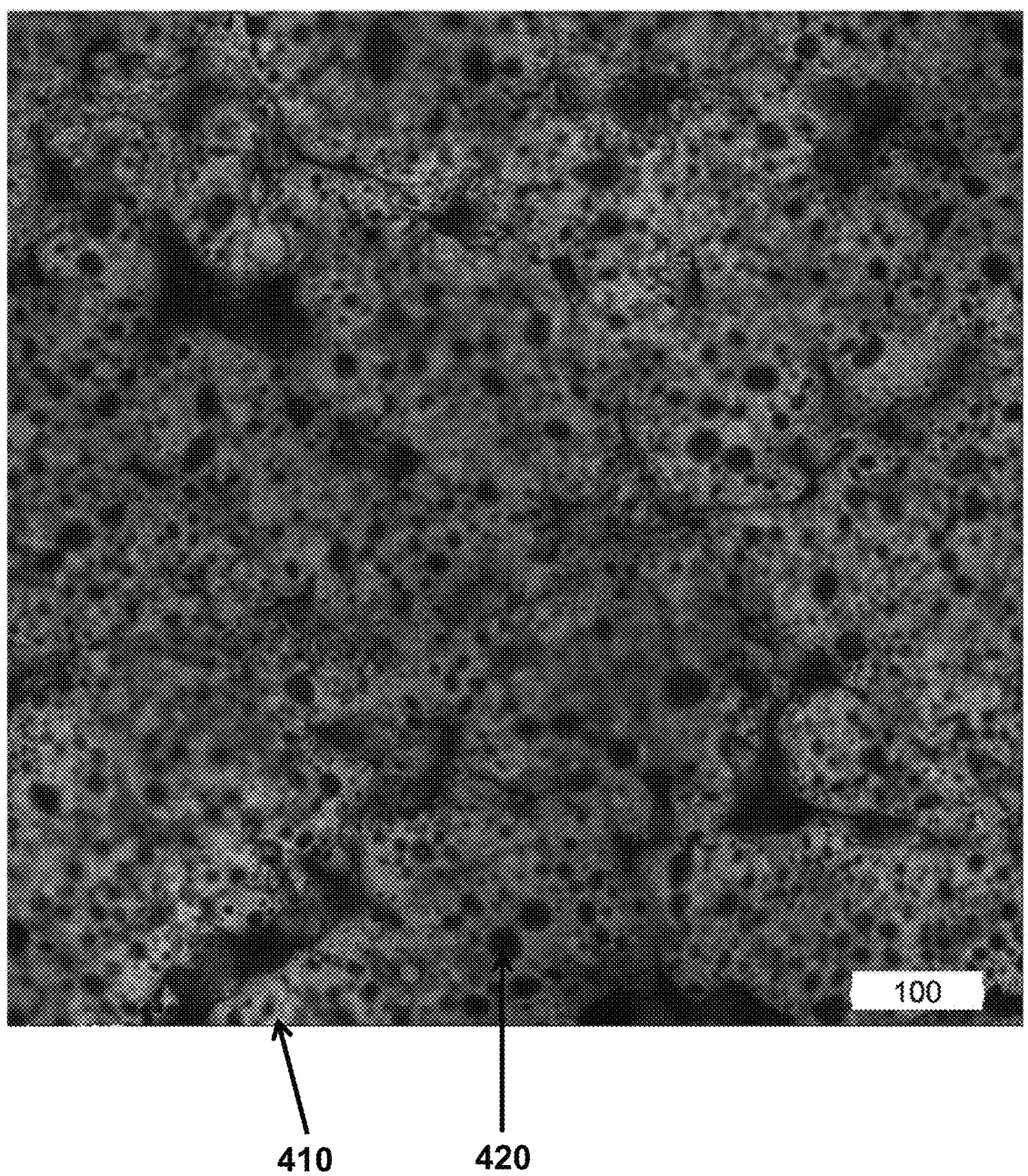
FIG. 4A is a confocal laser scanning microscopy image for the polymer film of Example 3 (scale bar=100 μm).
Figure 4B:
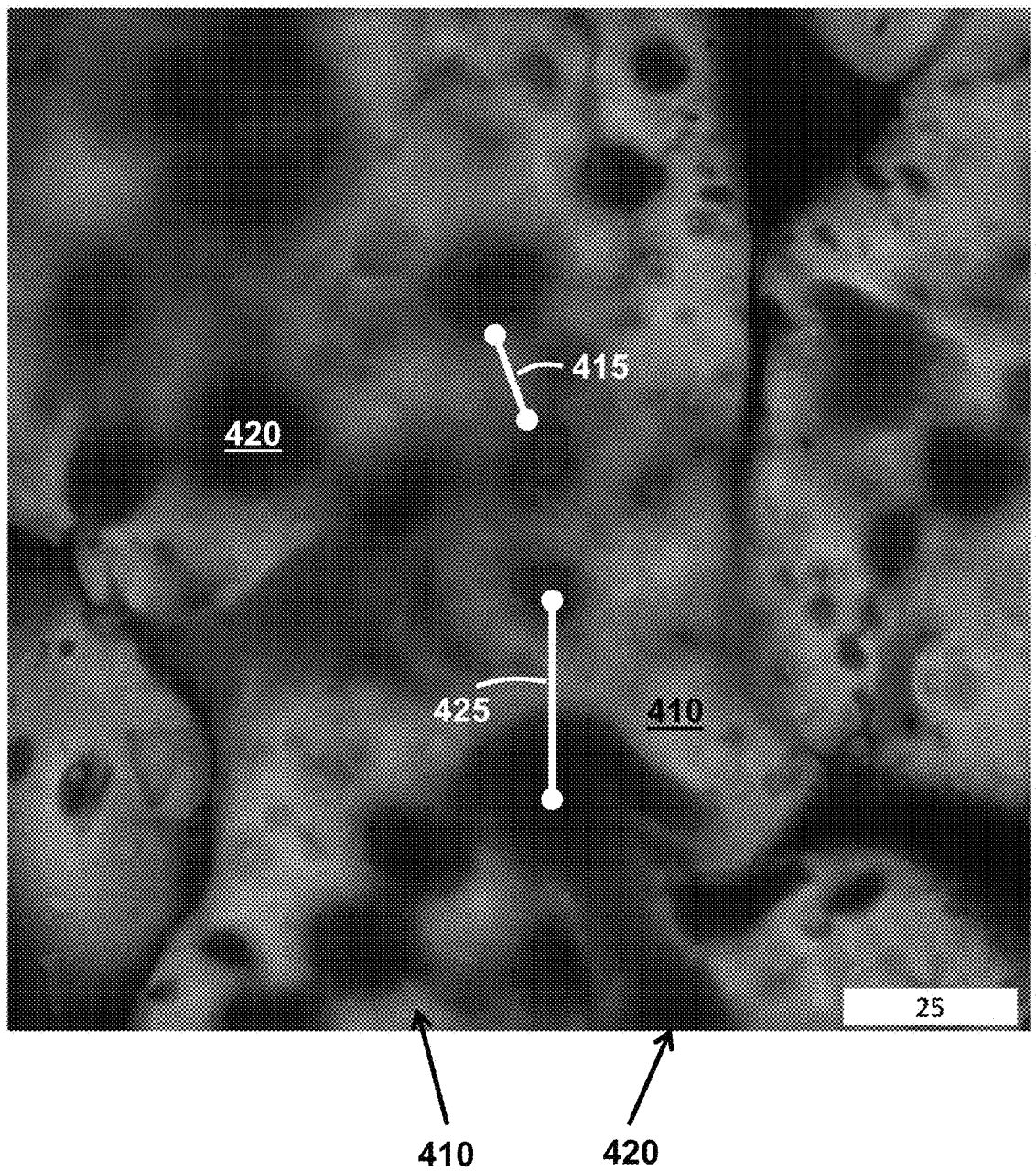
FIG. 4B is a confocal laser scanning microscopy image for the polymer film of Example 3 (scale bar=25 μm).

Confocal microscopy is again employed, using the same procedure as described in Example 1. FIGS. 4A and 4B show confocal laser scanning microscopy (CLSM) images for the polymer film with 50 mol % PEG content. CLSM images are shown at different magnifications of the Example 2 films soaked with water-soluble fluorescent dye.

The fluorescent regions 410 (which display as green regions in the color drawings and lighter regions when reproduced in grayscale) are representative of hydrophilic PEG regions containing a water-soluble fluorescent dye. The inclusions 420 (which display as darker regions) are representative of hydrophobic fluoropolymer regions. The scale bars are 100 µm and 25 µm in FIGS. 4A and 4B, respectively.

Microphase separation is shown in these images. The length scale of phase inhomogeneity for the structure in FIGS. 4A and 4B appears to be in the range of 1 to 100 microns. In particular, the phase inhomogeneity can be characterized by a length scale associated with a discrete phase 420. For example, the length scale of phase inhomogeneity may refer to the average size (e.g., effective diameter) of discrete inclusions of one phase 420 dispersed in a continuous phase 410. The selected (for illustration) inclusions 420 labeled in FIG. 4B have an effective diameter of about 15-20 microns; generally the inclusions have an effective diameter of about 1 to 100 microns in FIGS. 4A and 4B. The length scale of phase inhomogeneity may refer to the average center-to-center distance 425 between nearest-neighbor inclusions of the same phase 420. In FIG. 4B, the selected center-to-center distance 425 is about 30 microns. The length scale of phase inhomogeneity may alternatively refer to the average separation distance 415 between nearest-neighbor regions of the discrete (e.g., droplets) phase 420, i.e. the size of the continuous phase 410 regions. In FIG. 4B, the selected separation distance 415 is about 15 microns. A range of particle sizes and separations is clearly present in this structure; the specific instances of features 410, 415, 420, and 425 were arbitrarily selected.

As described earlier, emulsified droplets rich in either PEG or PFPE are sprayed or cast from a mixture. Upon addition of a curative and the evaporation of a solvent, these droplets coalesce to form a continuous film that is inhomogeneous on the microscale (1-100 μm). In FIGS. 4A and 4B, the dark PFPE-rich areas form a discrete phase (420) that is hydrophobic in character, while the dyed PEG-rich regions form a continuous phase (410) surrounding the discrete regions.

Example 3

Preparation of Segmented Copolymer (25% PEG Content) with Microphase-Separated Regions PEG (0.6 mmoles, 2.0 g) and HMDI (11.8 mmoles, 3.08 g) are added into a 3-neck flask equipped with a mechanical stirrer. The reaction flask is placed in a 100° C. oil bath and the reaction is carried out under argon. Once PEG is melted and dissolved in the HMDI, 2.4 μL of DBTDL is added to the mix. The reaction mixture is stirred at 100° C. for 1 hour. Fluorolink D4000 (1.8 mmoles, 7.06 g) is added and stirring is continued for another 1 hour. The reaction flask is removed from the 100° C. oil bath, and is allowed to cool down before adding THF (10 mL) and BD (9.4 mmoles, 0.85 g) dissolved in THF (2 mL). The sample is sprayed with an airbrush using a 0.5-mm needle nozzle aperture to a thickness of 1-5 (about 25-125 microns) mils on aluminum, glass and Mylar® (biaxially-oriented polyethylene terephthalate) film.

Figure 5A:
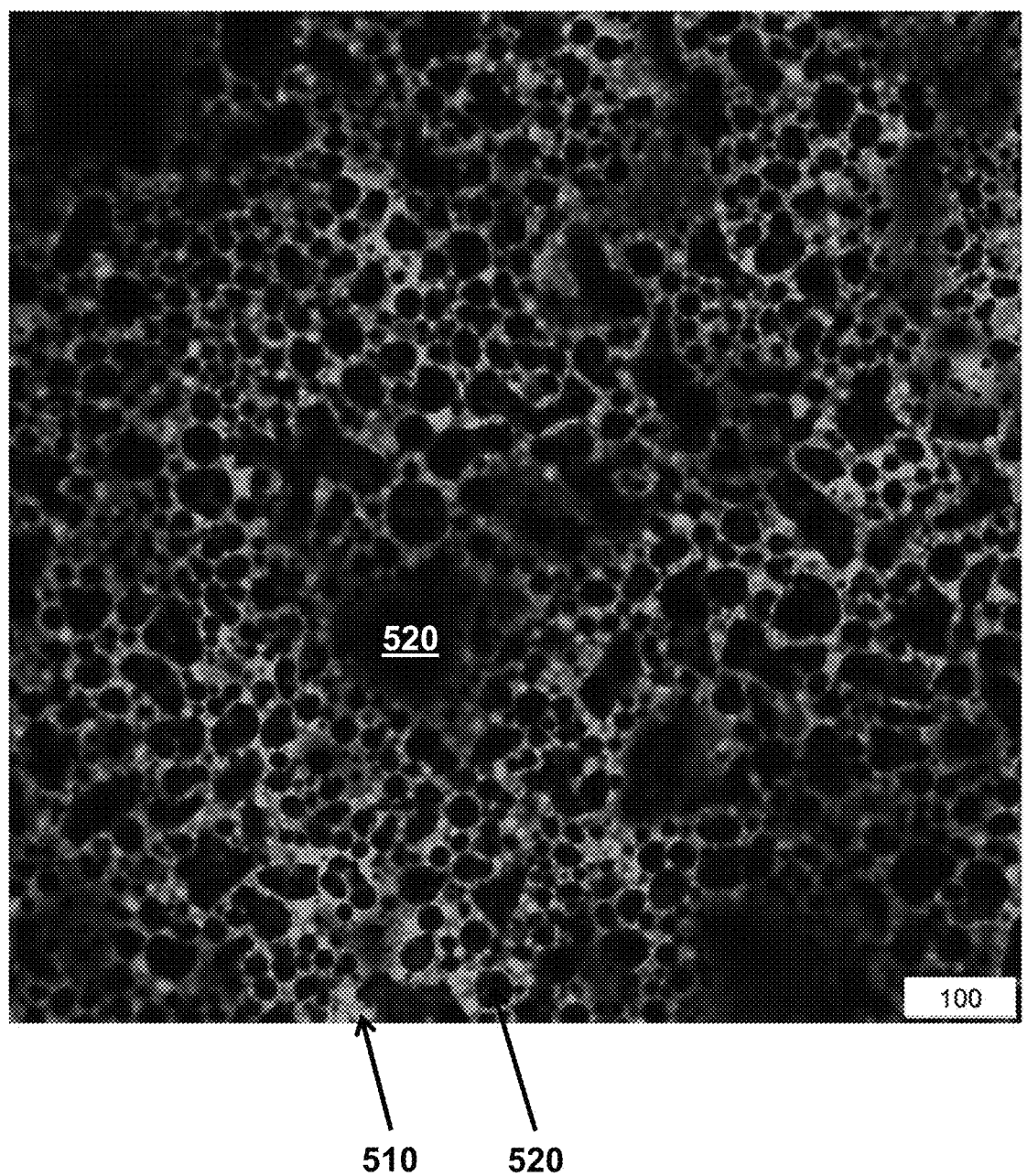
FIG. 5A is a confocal laser scanning microscopy image for the polymer film of Example 1 (scale bar=100 μm).
Figure 5B:
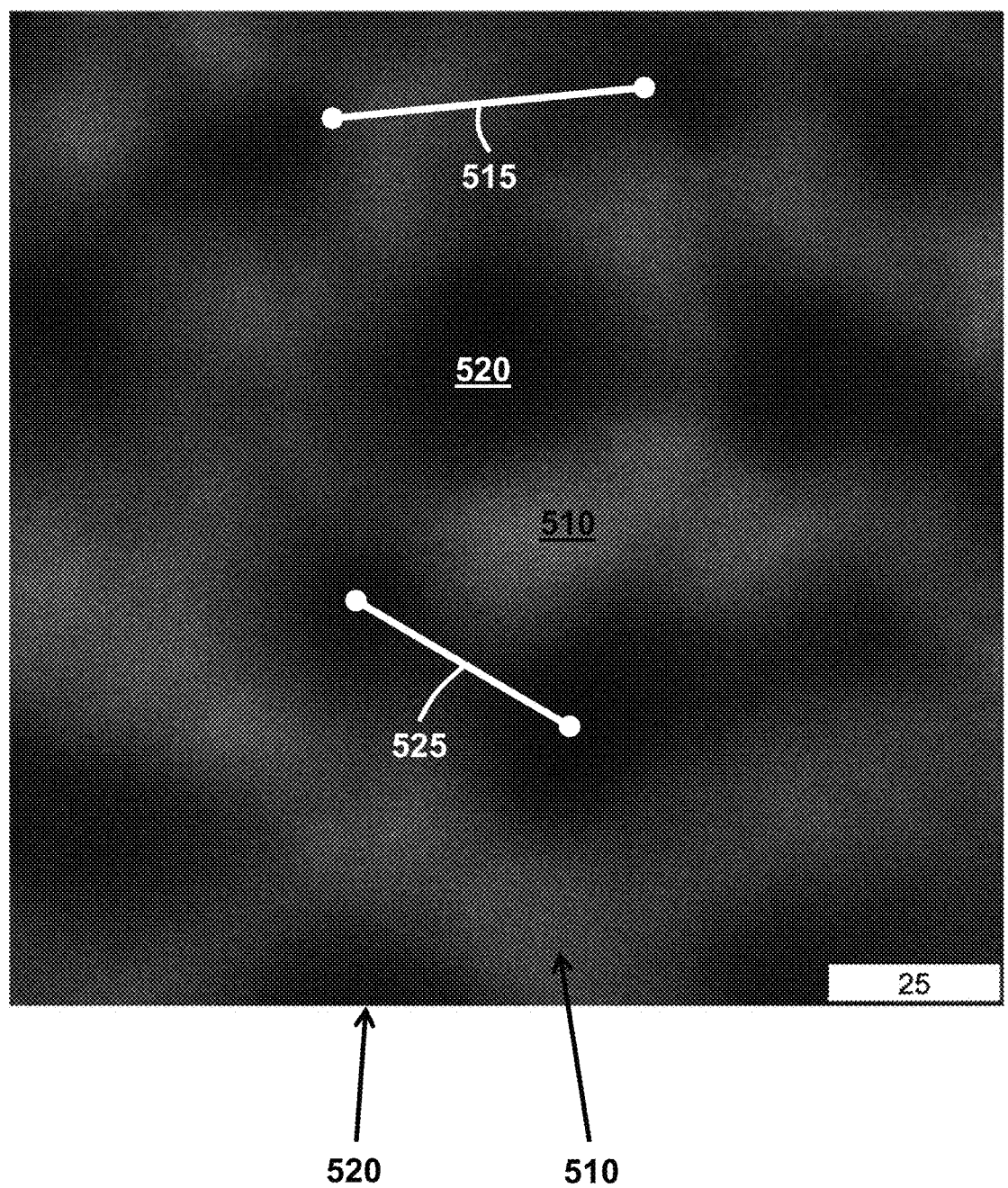
FIG. 5B is a confocal laser scanning microscopy image for the polymer film of Example 3 (scale bar=25 μm).

Confocal microscopy is again employed, using the same procedure as described in Example 1. FIGS. 5A and 5B show confocal laser scanning microscopy (CLSM) images for the polymer film with 25 mol % PEG content. CLSM images are shown at different magnifications of the Example 3 films soaked with water-soluble fluorescent dye.

The fluorescent regions 510 (which display as green regions in the color drawings and lighter regions when reproduced in grayscale) are representative of hydrophilic PEG regions containing a water-soluble fluorescent dye. The inclusions 520 (which display as darker regions) are representative of hydrophobic fluoropolymer regions. The scale bars are 100 μm and 25 μm in FIGS. 5A and 5B, respectively.

Microphase separation is shown in these images. The length scale of phase inhomogeneity for the structure in FIGS. 5A and 5B appears to be in the range of 1 to 100 microns. In particular, the phase inhomogeneity can be characterized by a length scale associated with a discrete phase 520. For example, the length scale of phase inhomogeneity may refer to the average size (e.g., effective diameter) of discrete inclusions of one phase 520 dispersed in a continuous phase 510. The selected (for illustration) inclusions 520 labeled in FIG. 5B have an effective diameter of about 35 microns; generally the inclusions have an effective diameter of about 5 to 100 microns in FIGS. 5A and 5B. The length scale of phase inhomogeneity may refer to the average center-to-center distance 525 between nearest-neighbor inclusions of the same phase 520. In FIG. 5B, the selected center-to-center distance 525 is about 40 microns. The length scale of phase inhomogeneity may alternatively refer to the average separation distance 515 between nearest-neighbor regions of the discrete (e.g., droplets) phase 520, i.e. the size of the continuous phase 510 regions. In FIG. 5B, the selected separation distance 515 is about 50 microns. A range of particle sizes and separations is clearly present in this structure; the specific instances of features 510, 515, 520, and 525 were arbitrarily selected.

As described earlier, emulsified droplets rich in either PEG or PFPE are sprayed or cast from a mixture. Upon addition of a curative and the evaporation of a solvent, these droplets coalesce to form a continuous film that is inhomogeneous on the microscale (1-100 μm). In FIGS. 5A and 5B, the dark PFPE-rich areas form a discrete phase (520) that is hydrophobic in character, while the dyed PEG-rich regions form a continuous phase (510) surrounding the discrete regions.

Example 4

Impedance Spectroscopy of the Example 1, Example 2, and Example 3 Polymer Films

The interconnectivity of a single phase through the polymer network is indirectly investigated using electrochemical impedance spectroscopy (EIS). A two-electrode, humidity-controlled electrochemical cell is constructed to measure ionic conductivity through the membrane. Measurements are made on the segmented copolymers of Examples 1, 2, and 3 having 75% PEG content, 50% PEG content, and 25% PEG content, respectively.

Figure 6:
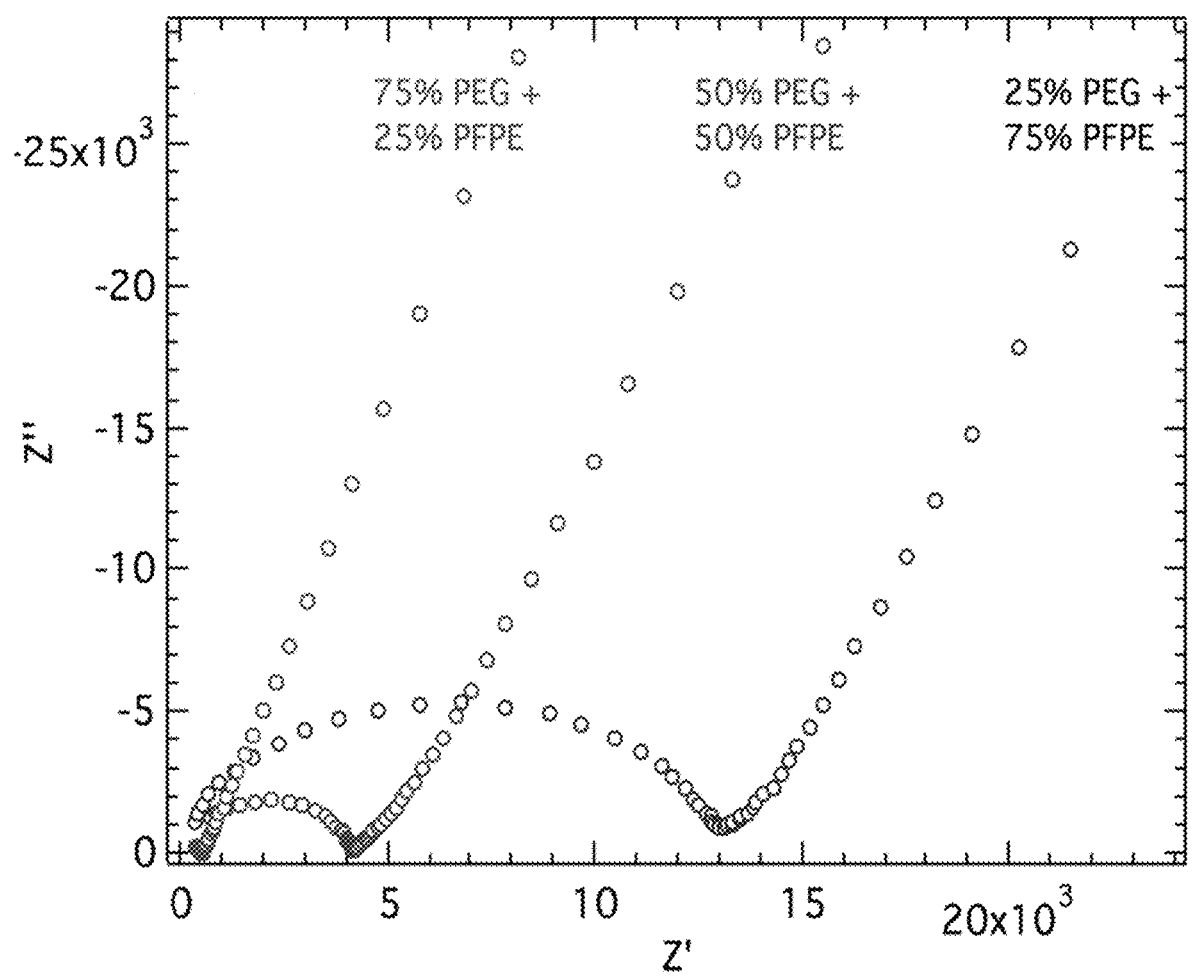
FIG. 6 is a series of Nyquist plots from three humidified polymeric coatings composed of variable concentrations of fluoropolymer and poly(ethylene glycol) flexible segments, in Example 4.
Figure 7:
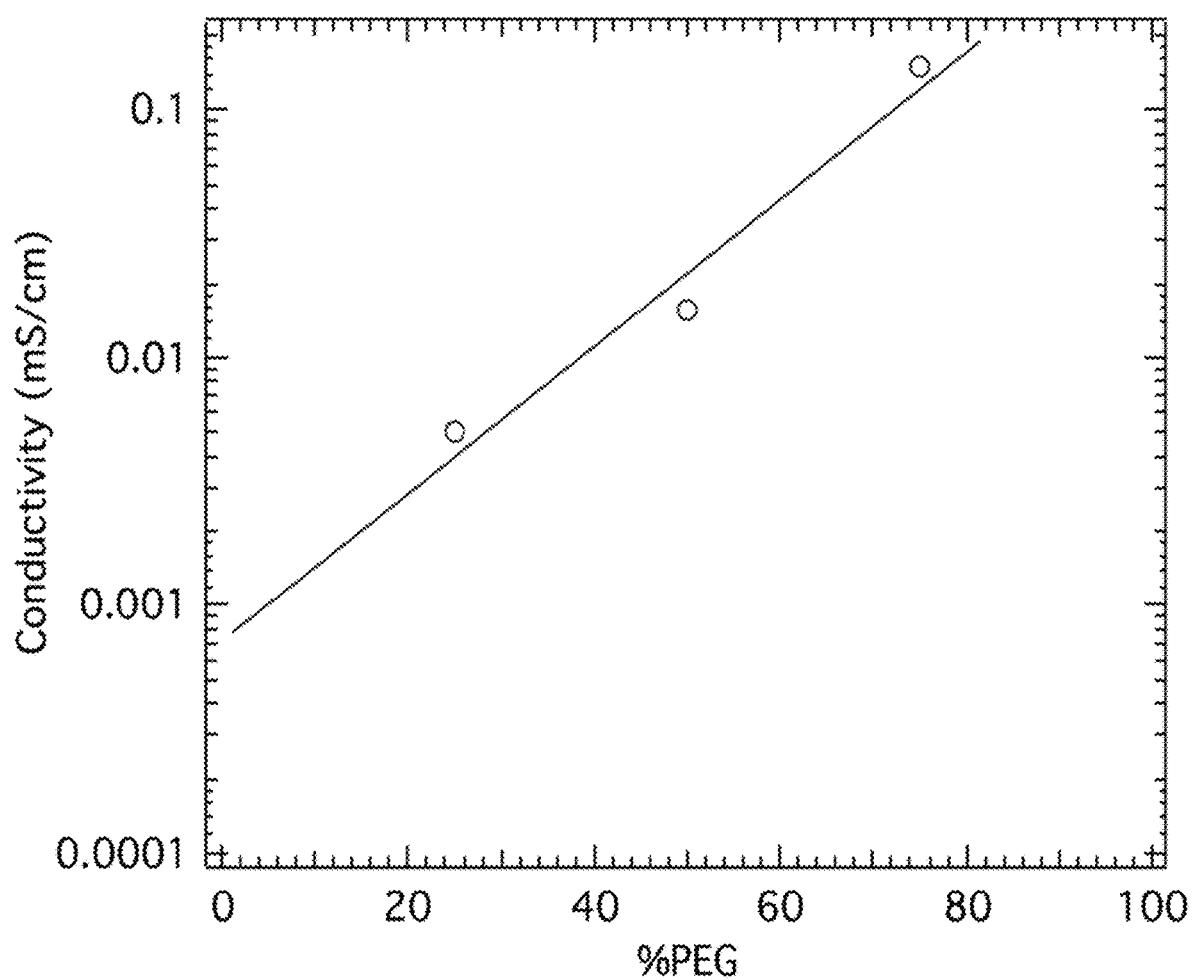
FIG. 7 is a plot of ionic conductivities on a log scale as a function of PEG content, in Example 4. These plots reveal a strong correlation between ionic conductivity and concentration of hygroscopic component (PEG), and indicate continuity of the hygroscopic phase throughout the film.

FIG. 6 shows Nyquist plots from the series of three humidified polymeric coatings composed of variable concentrations of fluoropolymer and poly(ethylene glycol) flexible segments. The real (Z') and imaginary (Z") components of the impedance were measured over a frequency range from $10^6$ Hz to 0.1 Hz. The extrinsic resistance is determined by extrapolating the semicircle and taking the value of Z' at Z"=0. The intrinsic conductivities of the humidified films are determined from the resistance, film thickness, and surface area. The intrinsic conductivities ranged from $5 \times 10^{-6}$ S/cm (25% PEG) to $1.5 \times 10^{-4}$ S/cm (75% PEG) and scaled with PEG content, as shown in FIG. 7. FIG. 7 plots ionic conductivities on a log scale as a function of PEG content. FIGS. 6 and 7 reveal a strong correlation between ionic conductivity and concentration of hygroscopic component (PEG), and indicate continuity of the hygroscopic phase throughout the film.

The same films measured under dry conditions exhibited no measurable conductivity. These results reveal two important points. First, water is incorporated into the hygroscopic PEG phase and is responsible for the high ionic conductivities measured in the humidified samples. Second, the hygroscopic layer (PEG phase) is interconnected and exists throughout the film.

Example 5

Incorporation of Liquid Electrolyte into Example 3 Polymer Film

Here we demonstrate a liquid electrolyte incorporated into a multiphase polymer network to significantly enhance the ionic conductivity, without altering the structure of the network. Three films of identical composition, containing 25% PEG and 75% fluoropolymer (from Example 3), are prepared. One film is soaked in deionized water for 24 hr. A second film is exposed to 100% humidity (no soak or wash).

A third film is soaked in an electrolyte solution of 1 M NaCl+$H_2O$ (deionized water, i.e. DI water) solution for 24 hr. The three films are blotted dry and inserted into a 2-electrode electrochemical cell under ambient humidity.

Figure 8:
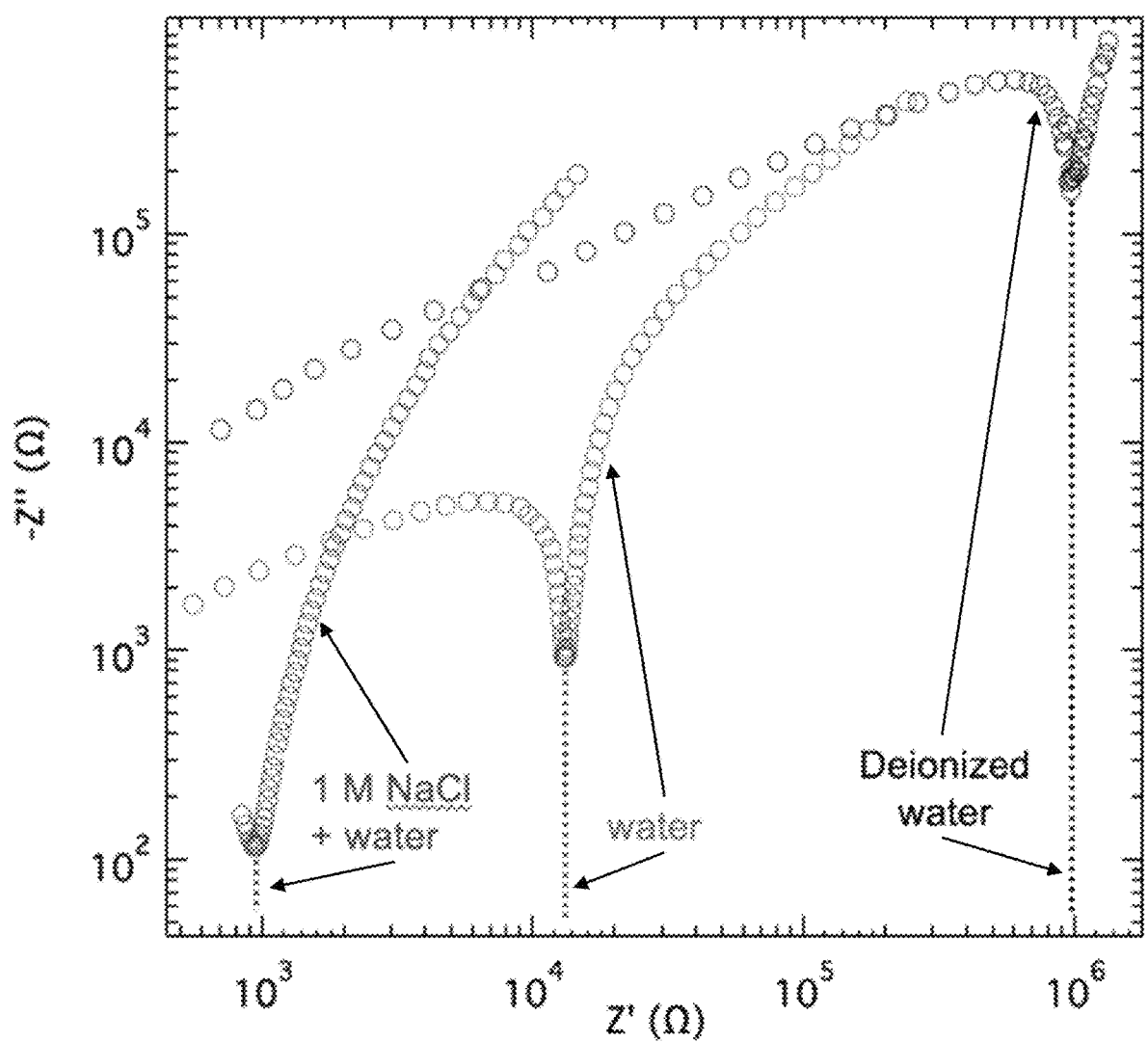
FIG. 8 is a series of Nyquist plots for three polymer films of Example 5, on a log-log scale with a dashed line indicating the film resistance.

FIG. 8 shows Nyquist plots for the three films, on a log-log scale with a dashed line indicating the film resistance. An increase in ionic conductivity of over three orders of magnitude is observed between the film soaked in DI water (approximately $1.6 \times 10^{-8}$ S/cm) and the film soaked in 1 M NaCl (approximately $2.1 \times 10^{-5}$ S/cm).

These results demonstrate a composition comprising first soft segments and second soft segments that are chemically distinct, wherein the first soft segments and the second soft segments are microphase-separated; and a liquid electrolyte selectively disposed in the second soft segments (PEG phase). The composition properties can be modified by tailoring the incorporated liquid(s).

Depending on the nature of the liquid, relevant applications exist in automotive and aerospace including enhanced performance with anti-fouling or anti-corrosion properties. Additionally, potential applications lie in the area of energy storage. The basis of the technology addresses the issue of scale and durability, employing chemistry and methods compatible with commercial production processes. The compositions provided herein have economic scalability for both the synthesis (e.g., self-organizing polymer domains) and application of the coating (e.g., spray coating).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An anti-fouling segmented copolymer composition comprising:
   (a) one or more first soft segments selected from fluoropolymers having an average molecular weight from about 500 g/mol to about 20,000 g/mol, wherein said fluoropolymers are ($\alpha,\omega$)-hydroxyl-terminated, ($\alpha,\omega$)-amine-terminated, and/or ($\alpha,\omega$)-thiol-terminated;
   (b) one or more second soft segments selected from polyesters or polyethers, wherein said polyesters or polyethers are ($\alpha,\omega$)-hydroxyl-terminated, ($\alpha,\omega$)-amine-terminated, and/or ($\alpha,\omega$)-thiol-terminated;
   (c) one or more isocyanate species possessing an isocyanate functionality of 2 or greater, or a reacted form thereof;
   (d) one or more polyol or polyamine chain extenders or crosslinkers, or a reacted form thereof; and
   (e) a liquid additive at least 60% selectively disposed in one of said first soft segments or said second soft segments,
   wherein said first soft segments and said second soft segments are microphase-separated on a microphase-separation length scale from about 0.5 microns to about 500 microns.

2. The anti-fouling segmented copolymer composition of claim 1, wherein said liquid additive is a freezing-point depressant for water.

3. The anti-fouling segmented copolymer composition of claim 2, wherein said freezing-point depressant for water is selected from the group consisting of methanol, ethanol, isopropanol, ethylene glycol, propylene glycol, glycerol, poly(ethylene glycol), and combinations, isomers, or homologous species thereof.

4. The anti-fouling segmented copolymer composition of claim 1, wherein said liquid additive is a lubricant.

5. The anti-fouling segmented copolymer composition of claim 4, wherein said lubricant is selected from the group consisting of fluorinated oils, fluorocarbon ether polymers of polyhexafluoropropylene, siloxanes, silicone-based oils, polydimethylsiloxanepoly(ethylene glycol) copolymers, polydimethylsiloxane-fluoropolymer copolymers, petroleum-derived oils, mineral oil, plant-derived oils, canola oil, soybean oil, and combinations thereof.

6. The anti-fouling segmented copolymer composition of claim 1, wherein said liquid additive is an electrolyte for use in battery or other energy-device applications.

7. The anti-fouling segmented copolymer composition of claim 6, wherein said electrolyte is selected from the group consisting of poly(ethylene glycol), dimethyl carbonate, diethyl carbonate, methyl ethyl dicarbonate, ionic liquids, and combinations thereof.

8. The anti-fouling segmented copolymer composition of claim 1, wherein said liquid additive includes alcohol groups, amine groups, thiol groups, or a combination thereof.

9. The anti-fouling segmented copolymer composition of claim 1, wherein said liquid additive includes water.

10. The anti-fouling segmented copolymer composition of claim 1, wherein said liquid additive is at least partially in gel form.

11. The anti-fouling segmented copolymer composition of claim 1, wherein said liquid additive further contains a solid lubricant suspended or dissolved in said liquid.

12. The anti-fouling segmented copolymer composition of claim 1, wherein said fluoropolymers are present in the triblock structure:

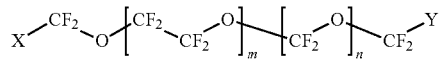

wherein:
X, Y=$CH_2$—(O—$CH_2$—$CH_2$)$_p$-T, and X and Y are independently selected;
p=1 to 50;
T is a hydroxyl, amine, or thiol terminal group;
m=1 to 100; and
n=0 to 100.

13. The anti-fouling segmented copolymer composition of claim 12, wherein n=1 to 100.

14. The anti-fouling segmented copolymer composition of claim 1, wherein the molar ratio of said second soft segments to said first soft segments is less than 2.0.

15. The anti-fouling segmented copolymer composition of claim 1, wherein said first soft segments and said second soft segments further are nanophase-separated on a nanophase-separation length scale from about 10 nanometers to about 100 nanometers, and wherein said nanophase-separation length scale is hierarchically distinct from said microphase-separation length scale.

16. The anti-fouling segmented copolymer composition of claim 1, wherein said liquid additive is present in said composition at a concentration from about 1 wt % to about 75 wt %.

17. The anti-fouling segmented copolymer composition of claim 1, wherein said composition is present in a coating.

18. An anti-fouling segmented copolymer precursor composition comprising:
(a) one or more first soft segments selected from fluoropolymers having an average molecular weight from about 500 g/mol to about 20,000 g/mol, wherein said fluoropolymers are (α,ω)-hydroxyl-terminated, (α,ω)-amine-terminated, and/or (α,ω)-thiol-terminated;
(b) one or more second soft segments selected from polyesters or polyethers, wherein said polyesters or polyethers are (α,ω)-hydroxyl-terminated, (α,ω)-amine-terminated, and/or (α,ω)-thiol-terminated;
(c) one or more isocyanate species possessing an isocyanate functionality of 2 or greater, or a reacted form thereof;
(d) one or more polyol or polyamine chain extenders or crosslinkers, or a reacted form thereof; and
(e) a liquid additive precursor at least 60% selectively disposed in one of said first soft segments or said second soft segments, wherein said liquid additive precursor includes a protecting group,
wherein said first soft segments and said second soft segments are microphase-separated on a microphase-separation length scale from about 0.5 microns to about 500 microns.

19. The anti-fouling segmented copolymer precursor composition of claim 18, wherein said liquid additive precursor includes alcohol groups and at least one protecting group that protects said alcohol groups from reacting with said anti-fouling segmented copolymer precursor composition.

20. The anti-fouling segmented copolymer precursor composition of claim 18, wherein said liquid additive precursor includes amine groups and at least one protecting group that protects said amine groups from reacting with said anti-fouling segmented copolymer precursor composition.

21. The anti-fouling segmented copolymer precursor composition of claim 18, wherein said liquid additive precursor includes thiol groups and at least one protecting group that protects said thiol groups from reacting with said anti-fouling segmented copolymer precursor composition.

22. The anti-fouling segmented copolymer precursor composition of claim 18, wherein said liquid additive precursor includes a protecting group that is capable of deprotecting said liquid additive precursor in the presence of atmospheric moisture.

23. The anti-fouling segmented copolymer precursor composition of claim 18, wherein said liquid additive precursor is capable of condensation curing to increase its molecular weight.

24. The anti-fouling segmented copolymer precursor composition of claim 18, wherein said fluoropolymers are present in the triblock structure:

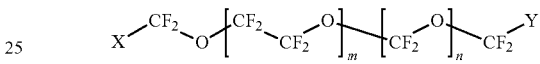

wherein:
X, Y=$CH_2$—(O—$CH_2$—$CH_2$)$_p$-T, and X and Y are independently selected;
p=1 to 50;
T is a hydroxyl, amine, or thiol terminal group;
m=1 to 100; and
n=0 to 100.

25. The anti-fouling segmented copolymer precursor composition of claim 18, wherein the molar ratio of said second soft segments to said first soft segments is less than 2.0.

26. The anti-fouling segmented copolymer precursor composition of claim 18, wherein said liquid additive precursor is present in said composition at a concentration from about 1 wt % to about 75 wt %.

27. The anti-fouling segmented copolymer composition of claim 17, wherein said microphase-separation length scale is from about 0.5 microns to about 100 microns.

28. The anti-fouling segmented copolymer precursor composition of claim 18, wherein said microphase-separation length scale is from about 0.5 microns to about 100 microns.

* * * * *